US008965648B1

(12) United States Patent
Murayama

(10) Patent No.: US 8,965,648 B1
(45) Date of Patent: Feb. 24, 2015

(54) TRANSMISSION AND STRADDLE-TYPE VEHICLE

(71) Applicant: Yamaha Hatsudoki Kabushiki Kaisha, Iwata-shi, Shizuoka (JP)

(72) Inventor: Takuya Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/494,625

(22) Filed: Sep. 24, 2014

(30) Foreign Application Priority Data

Oct. 25, 2013 (JP) ................................. 2013-221875
Jul. 24, 2014 (JP) ................................. 2014-150378

(51) Int. Cl.
*G06F 7/00* (2006.01)
*G06F 17/00* (2006.01)
*G06F 19/00* (2011.01)
*F16H 61/02* (2006.01)
*F16H 3/08* (2006.01)

(52) U.S. Cl.
CPC ............. *F16H 61/0204* (2013.01); *F16H 3/08* (2013.01)
USPC ........................................................ 701/66

(58) Field of Classification Search
CPC ..................... B60W 10/02; B60W 2110/0208; B60W 2510/1015; B60W 2510/1025; B60W 2710/021; B60W 2710/028; B60W 2710/1011
USPC ............ 701/66, 67, 53; 477/79, 80, 115, 116
See application file for complete search history.

(56) References Cited

U.S. PATENT DOCUMENTS

| 5,704,873 | A  | * | 1/1998 | Iwata et al. ................ 477/115 |
| 7,912,617 | B2 | * | 3/2011 | Wright et al. ................ 701/67 |
| 2003/0054920 | A1 | * | 3/2003 | Berger et al. ................ 477/70 |

FOREIGN PATENT DOCUMENTS

| EP | 2 515 009 A2 | 10/2012 |
| JP | 2004-011774 A | 1/2004 |
| JP | 2012-225436 A | 11/2012 |

* cited by examiner

*Primary Examiner* — Justin Holmes
(74) *Attorney, Agent, or Firm* — Keating & Bennett, LLP

(57) ABSTRACT

A transmission includes a dog clutch type transmission mechanism, a clutch actuator that drives a clutch, a shift actuator that moves a movable gear of the transmission mechanism, and a delay time setting section that sets a delay time which is a time period between start of disengagement of the clutch and start of movement of the movable gear. When an engagement force between dog portions to be disengaged from each other is a first engagement force, the delay time setting section sets the delay time to a first delay time. When the engagement force is a second engagement force smaller than the first engagement force, the delay time setting section sets the delay time to a second delay time shorter than the first delay time.

11 Claims, 15 Drawing Sheets

TRANSMISSION AND STRADDLE-TYPE VEHICLE

This application claims priority to Japanese Patent Application No. 2013-221875 filed in Japan on Oct. 25, 2013, and Application No. 2014-150378 filed in Japan on Jul. 24, 2014, the entire contents of which are hereby incorporated by reference.

BACKGROUND OF THE INVENTION

1. Field of the Invention

The present invention relates to transmissions and straddle-type vehicles including the transmissions.

2. Description of the Related Art

A conventionally known transmission includes a dog clutch type transmission mechanism, a clutch actuator that causes a clutch to be disengaged and engaged, and a shift actuator that drives the transmission mechanism. The dog clutch type transmission mechanism includes a plurality of gears provided on a main shaft and a drive shaft. These gears include a movable gear that is axially movable and a fixed gear that is axially immovable. Concave or convex portions, each called a "dog portion", are provided on lateral surfaces of the movable and fixed gears. The movable gear is disposed between the fixed gears, and the dog portion of the movable gear and the dog portion of the fixed gear are provided so as to be engageable with each other. A transmission gear ratio is changed by changing a combination of the movable and fixed gears engaged with each other.

The above-described transmission performs a speed change as follows. The clutch actuator temporarily disengages the clutch, and then engages the clutch again. The shift actuator moves the movable gear axially. In this transmission, the movable gear is disposed between first and second fixed gears, and the shift actuator moves the movable gear from the first fixed gear toward the second fixed gear. The shift actuator starts movement of the movable gear after disengagement of the clutch has been started. Upon driving of the shift actuator, the movable gear is moved away from the first fixed gear, and the dog portion of the movable gear and the dog portion of the first fixed gear are disengaged from each other. This disengagement will be referred to as "dog disengagement". Subsequently, the movable gear moves toward the second fixed gear, and comes into contact with the second fixed gear. At this point, the dog portion of the movable gear and the dog portion of the second fixed gear are engaged with each other. This engagement will be referred to as "dog engagement". After the dog portion of the movable gear and the dog portion of the second fixed gear have been engaged with each other, the clutch enters an engaged state.

Prior to a speed change, the movable and fixed gears are rotated together, and a frictional force is produced between the dog portion of the movable gear and the dog portion of the first fixed gear. In order to effect dog disengagement, the movable gear has to be moved with a force greater than the frictional force. When the frictional force is great, dog disengagement cannot be effected easily, thus taking a long time to complete dog disengagement. Therefore, a speed change time is prolonged. The frictional force tends to increase as an engine torque is increased. With the aim of facilitating dog disengagement, JP 2004-11774 A discloses a technique in which an engine torque is temporarily decreased by performing ignition cutoff, and then movement of a movable gear is started. The speed change time can be reduced by facilitating dog disengagement.

It is conceivable that the movable gear may be moved quickly in order to reduce the speed change time. However, when the movable gear is moved quickly, the movable gear strongly collides with the second fixed gear even though a time required for dog disengagement is reduced. In this case, a phenomenon that the dog portion of the movable gear and the dog portion of the second fixed gear hit against each other without engaging with each other, i.e., "dog hitting", is likely to occur. JP 2012-225436 A discloses a technique in which a movable gear is moved quickly at the time of dog disengagement, but the movable gear is braked immediately before dog engagement.

The techniques disclosed in JP 2004-11774 A and JP 2012-225436 A are both used in order to reduce the speed change time. However, when movement of the movable gear is started after clutch disengagement has been started and then the engine torque has been decreased as disclosed in JP 2004-11774 A, a driver may feel that the speed change time is long even if a time required for dog disengagement is short. When a time period between start of clutch disengagement and start of movement of the movable gear is short but a time period between the start of movement of the movable gear and end of the movement is long as disclosed in JP 2012-225436 A, a driver may feel that the speed change time is long. Hence, the above-described conventional techniques cannot effectively and reliably reduce the speed change time perceived by a driver.

SUMMARY OF THE INVENTION

Accordingly, preferred embodiments of the present invention provide a transmission including a dog clutch type transmission mechanism, a clutch actuator, and a shift actuator that effectively reduce a speed change time perceived by a driver.

The inventor of the preferred embodiments of the present invention has given attention to the fact that an engagement force produced between a dog portion of a main shaft gear or a drive shaft gear and a dog portion of a movable gear when the dog portions are engaged with each other varies depending on a speed provided by the gears of a transmission mechanism, magnitude of an engine torque, and shapes of the dog portions, for example. When the engagement force between the dog portions is relatively small, a time required until dog disengagement of the movable gear is enabled is relatively short. On the other hand, when the engagement force between the dog portions is relatively large, the time required until dog disengagement of the movable gear is enabled is relatively long. As a result of conducting various studies, the inventor of the preferred embodiments of the present invention has discovered that a speed change time perceived by a driver is effectively reduced by appropriately setting a time period between start of clutch disengagement and start of movement of the movable gear on the basis of the magnitude of the engagement force between the dog portions.

A transmission according to a preferred embodiment of the present invention preferably includes a clutch that transmits or interrupts an engine torque; a transmission mechanism which includes a main shaft connected to the clutch, main shaft gears corresponding to first to Nth speeds (where N is a natural number equal to or greater than 2) provided on the main shaft, drive shaft gears corresponding to the first to Nth speeds intermeshing with the main shaft gears for the first to Nth speeds, respectively, a drive shaft provided with the drive shaft gears, and a movable gear provided on the main shaft or the drive shaft so as to be movable in an axial direction of the main shaft or the drive shaft, and in which a dog portion is provided on a lateral surface of the movable gear and a dog portion engageable with the dog portion of the movable gear is provided on a lateral surface of at least one of the main shaft gears, and/or a dog portion is provided on a lateral surface of the movable gear and a dog portion engageable with the dog portion of the movable gear is provided on a lateral surface of at least one of the drive shaft gears; a clutch actuator that causes the clutch to be disengaged and engaged; a shift actuator that axially moves the movable gear; a delay time setting device that sets a delay time which is a time period between start of disengagement of the clutch and start of movement of the movable gear; and an actuator controller programmed to control the clutch actuator and the shift actuator so that the movement of the movable gear is started after a lapse of the delay time, set by the delay time setting device, from the start of disengagement of the clutch. The delay time setting device is programmed and configured to set the delay time to a first delay time when an engagement force between the dog portions which are to be disengaged from each other by the movement of the movable gear is a first engagement force, and to set the delay time to a second delay time shorter than the first delay time when the engagement force between the dog portions which are to be disengaged from each other by the movement of the movable gear is a second engagement force smaller than the first engagement force.

Unlike the conventional technique in which the delay time is set uniformly, the above-described transmission appropriately changes the start timing of movement of the movable gear in consideration of a difference in the engagement force between the dog portions. In the transmission, when the engagement force between the dog portions is the second engagement force smaller than the first engagement force, the delay time is set to the second delay time shorter than the first delay time. Thus, an operation of the shift actuator is started at an earlier time. Hence, the clutch is engaged early by completing the operation of the shift actuator early. Therefore, it is possible to avoid any wasted time during which a disengaged state of the clutch continues even though the clutch is engageable. As a result, a speed change time perceived by a driver is reduced. When the engagement force between the dog portions is the first engagement force greater than the second engagement force, the delay time is set to the first delay time longer than the second delay time. If the delay time is short even though the engagement force between the dog portions is large, dog disengagement requires a long time in spite of the fact that the operation of the shift actuator is started. In that case, the driver feels that the speed change time is long. To cope with such a problem, in the above-described transmission, the delay time is set to the first delay time longer than the second delay time, and thus the engagement force between the dog portions is small when the movable gear starts to move, so that dog disengagement is facilitated. Hence, the shift actuator is prevented from being operated for a long period of time. Consequently, the speed change time perceived by the driver is reduced.

According to a preferred embodiment of the present invention, the delay time setting device is preferably programmed and configured to set the delay time on the basis of a speed provided by the main shaft gear including the dog portion to be disengaged from the dog portion of the movable gear, or a speed provided by the drive shaft gear including the dog portion to be disengaged from the dog portion of the movable gear.

When the speed provided by the gear varies, the engagement force produced between the dog portions also varies. Therefore, magnitude of the engagement force produced between the dog portions is estimated on the basis of magnitude of the speed provided by the gear. In the above-described preferred embodiment, the delay time is appropriately set on the basis of the speed provided by the gear, thus making it possible to reduce the speed change time perceived by the driver.

According to a preferred embodiment of the present invention, assuming that the speeds provided by the main shaft gears, including the dog portions to be disengaged from the dog portions of the movable gear, or the speeds provided by the drive shaft gears, including the dog portions to be disengaged from the dog portions of the movable gear, are pth and qth speeds (where p is a natural number equal to or greater than 1 and equal to or smaller than N−1, and q is a natural number greater than p and equal to or smaller than N), the delay time setting device is preferably programmed and configured to set the delay time for the pth speed and the delay time for the qth speed to the first delay time and the second delay time, respectively.

The engagement force between the dog portions increases as the speed provided by the gear is reduced. Therefore, the delay time is set so that the delay time is increased as the speed provided by the gear is reduced, thus making it possible to reduce time required for dog disengagement and the speed change time perceived by the driver.

According to a preferred embodiment of the present invention, the delay time setting device is preferably programmed and configured to set the delay time on the basis of the engine torque.

When the engine torque varies, the engagement force between the dog portions also varies. In the above-described preferred embodiment, the delay time is appropriately set on the basis of the engine torque, thus making it possible to reduce the speed change time perceived by the driver.

According to a preferred embodiment of the present invention, the clutch preferably is a friction clutch, and the delay time setting device is preferably programmed and configured to set the delay time to the first delay time when the engine torque is a first torque, and to set the delay time to the second delay time when the engine torque is a second torque greater than the first torque.

In a friction clutch, driving and driven members move away from each other at the time of disengagement of the clutch, and maximum static friction between the driving and driven members gradually decreases. When the maximum static friction is equal to static friction, the driving member starts to slide with respect to the driven member, and a torque of a main shaft decreases. However, when an engine torque is small, the static friction between the driving and driven members is small, and therefore, it might take a long time for the maximum static friction to decrease to the static friction even when the clutch is disengaged. In such a case, it requires a long time for an engagement force between dog portions to decrease. To cope with this problem, according to the above-described preferred embodiment, the delay time is set to be longer when the engine torque is small than when the engine torque is large. Thus, the movable gear starts to move after the engagement force between the dog portions has been sufficiently reduced, and therefore, the shift actuator is prevented from being operated for a long period of time. As a result, the speed change time perceived by the driver is reduced.

According to a preferred embodiment of the present invention, the delay time setting device is preferably programmed and configured to set the delay time on the basis of whether the gear, including the dog portion to be disengaged from the dog portion of the movable gear, is the main shaft gear or the drive shaft gear.

When the gear, including the dog portion to be disengaged from the dog portion of the movable gear, is the main shaft gear, an engagement force proportional to a torque of the main shaft is produced between the dog portion of the movable gear and the dog portion of the main shaft gear. On the other hand, when the gear, including the dog portion to be disengaged from the dog portion of the movable gear, is the drive shaft gear, an engagement force, obtained by multiplying the torque of the main shaft by a given ratio responsive to the speed provided by the drive shaft gear, is produced between the dog portion of the movable gear and the dog portion of the drive shaft gear. The engagement force between the dog portions to be disengaged from each other varies depending on whether the gear, including the dog portion to be disengaged from the dog portion of the movable gear, is the main shaft gear or the drive shaft gear. According to the above-described preferred embodiment, the delay time is appropriately set in consideration of the engagement force between the dog portions. Consequently, the speed change time perceived by the driver is reduced.

According to a preferred embodiment of the present invention, assuming that the speeds provided by the main shaft gears, including the dog portions to be disengaged from the dog portions of the movable gear, are pth and qth speeds (where p is a natural number equal to or greater than 1 and equal to or smaller than N−1, and q is a natural number greater than p and equal to or smaller than N) and that the delay time for the pth speed and the delay time for the qth speed are tp and tq, respectively, the delay times are set so that tp=tq.

When the gear, including the dog portion to be disengaged from the dog portion of the movable gear, is the main shaft gear, an engagement force proportional to the torque of the main shaft is produced between the dog portion of the movable gear and the dog portion of the main shaft gear. The engagement force between the dog portion of the movable gear and the dog portion of the main shaft gear remains substantially the same even when the speed provided by the main shaft gear varies. Accordingly, the same delay time is set for each speed, thus making it possible to reduce the speed change time perceived by the driver.

According to a preferred embodiment of the present invention, the delay time setting device is preferably programmed and configured to set the delay time on the basis of specifications for the dog portion of the movable gear, the dog portion of one or more of the main shaft gears, or the dog portion of one or more of the drive shaft gears.

When the specifications for the dog portion of the movable gear, the main shaft gears, or the drive shaft gears vary, the engagement force between the dog portions engaged with each other or resistance produced at the time of dog disengagement also varies. By setting the delay time on the basis of the specifications for the dog portion of the movable gear, the main shaft gears, or the drive shaft gears, the delay time is appropriately set in consideration of a difference in the engagement force between the dog portions or resistance produced at the time of dog disengagement. Consequently, the speed change time perceived by the driver is reduced.

According to a preferred embodiment of the present invention, the delay time setting device is preferably programmed and configured to set the delay time on the basis of a shape of the dog portion of the movable gear, the dog portion of the main shaft gears, or the dog portion of the drive shaft gears.

At the time of dog disengagement, resistance is produced by the engagement force between the dog portions engaged with each other. When the shape of the dog portion of the movable gear, the main shaft gears, or the drive shaft gears varies, the resistance also varies. By setting the delay time on the basis of the shape of the dog portion of the movable gear, the main shaft gears, or the drive shaft gears, the delay time is appropriately set in consideration of a difference in the resistance produced by the engagement force between the dog portions. Consequently, the speed change time perceived by the driver is significantly reduced or eliminated.

According to a preferred embodiment of the present invention, the delay time setting device is preferably programmed and configured to set the delay time on the basis of a distance between the dog portion of the movable gear and an axial center of the movable gear, a distance between the dog portion of the main shaft gears and an axial center of the main shaft gears, or a distance between the dog portion of the drive shaft gears and an axial center of the drive shaft gears.

When the torque remains the same, the engagement force between the dog portions is inversely proportional to the distance between the axial center and the dog portion. Hence, the engagement force between the dog portions increases as the distance between the axial center and the dog portion is shortened. When the distance between the dog portion of the movable gear and the axial center of the movable gear varies, the engagement force between the dog portions engaged with each other varies. When the distance between the dog portion of the main shaft gears and the axial center of the main shaft gears varies, the engagement force between the dog portions engaged with each other varies. When the distance between the dog portion of the drive shaft gears and the axial center of the drive shaft gears varies, the engagement force between the dog portions engaged with each other varies. By setting the delay time on the basis of the distance between the dog portion of the movable gear and the axial center of the movable gear, the distance between the dog portion of the main shaft gears and the axial center of the main shaft gears, or the distance between the dog portion of the drive shaft gears and the axial center of the drive shaft gears, the delay time is appropriately set in consideration of a difference in the engagement force between the dog portions. Consequently, the speed change time perceived by the driver is reduced.

A straddle-type vehicle according to a preferred embodiment of the present invention includes the above-described transmission.

According to a preferred embodiment of the present invention, the straddle-type vehicle achieves the above-described effects.

As described above, various preferred embodiments of the present invention provide a transmission including a dog clutch type transmission mechanism, a clutch actuator, and a shift actuator that effectively reduce a speed change time perceived by a driver.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
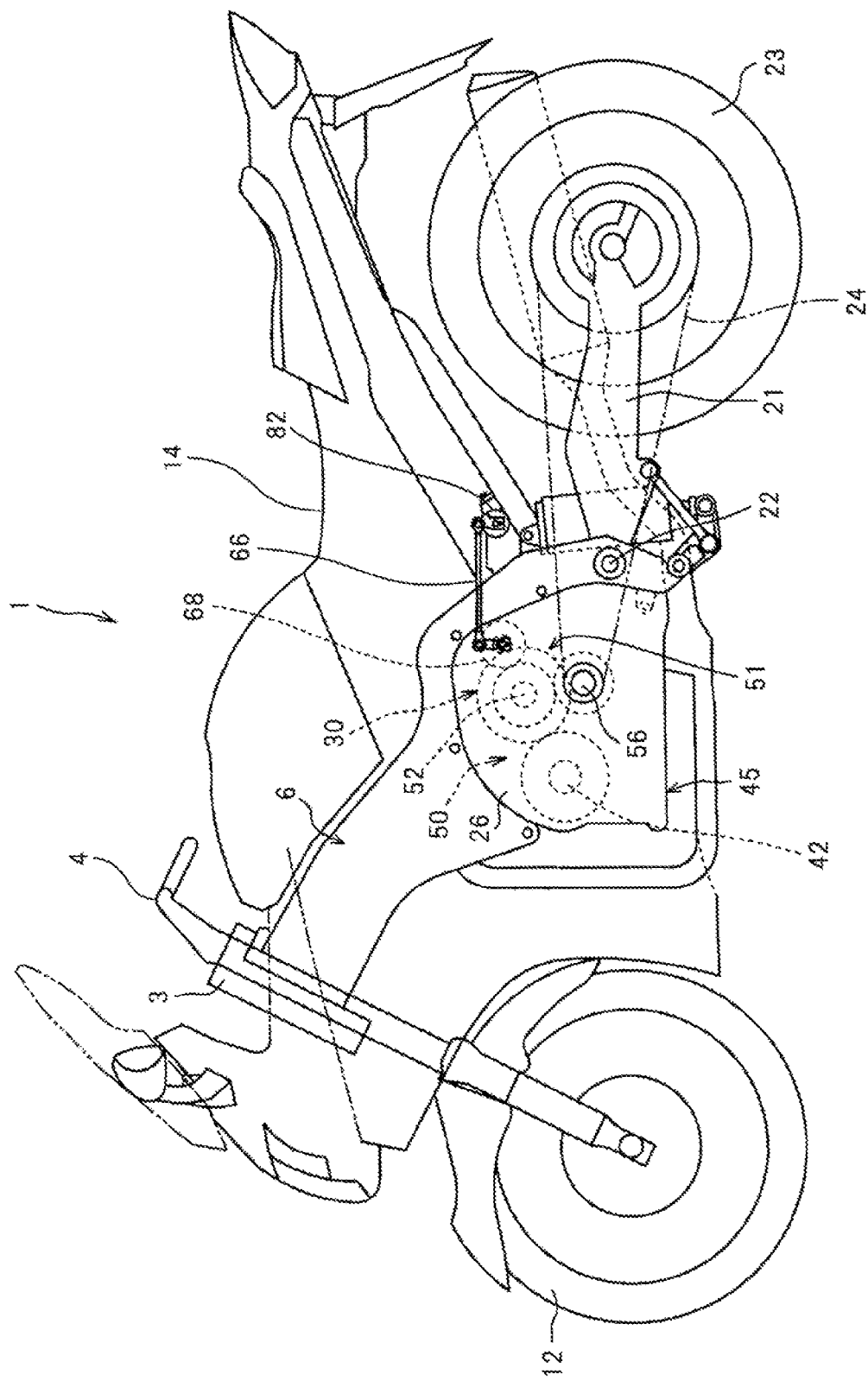
FIG. 1 is a side view of a motorcycle according to a first preferred embodiment of the present invention.

Hereinafter, preferred embodiments of the present invention will be described. As illustrated in FIG. 1, a straddle-type vehicle according to the present preferred embodiment is a motorcycle 1, for example. The motorcycle 1 is not limited to any particular type of motorcycle, but may be any type of motorcycle such as a "scooter-type", "moped-type", "off-road" or "street" motorcycle, for example. The straddle-type vehicle according to preferred embodiments of the present invention is not limited to a motorcycle, but may be any other vehicle that a rider (driver) straddles when getting on the vehicle. The straddle-type vehicle according to preferred embodiments of the present invention may be an ATV (All Terrain Vehicle) or a four-wheel buggy, for example.

In the following description, unless otherwise noted, the terms "front", "rear", "right", "left", "up" and "down" refer to front, rear, right, left, up and down with respect to a rider sitting on a seat 14 of the motorcycle 1, respectively.

As illustrated in FIG. 1, the motorcycle 1 preferably includes a head pipe 3, a body frame 6 fixed to the head pipe 3, a front wheel 12, and a rear wheel 23. A front end portion of a rear arm 21 is connected to a rear portion of the body frame 6 via a pivot shaft 22. The rear wheel 23 is rotatably supported by a rear end portion of the rear arm 21.

Figure 2:
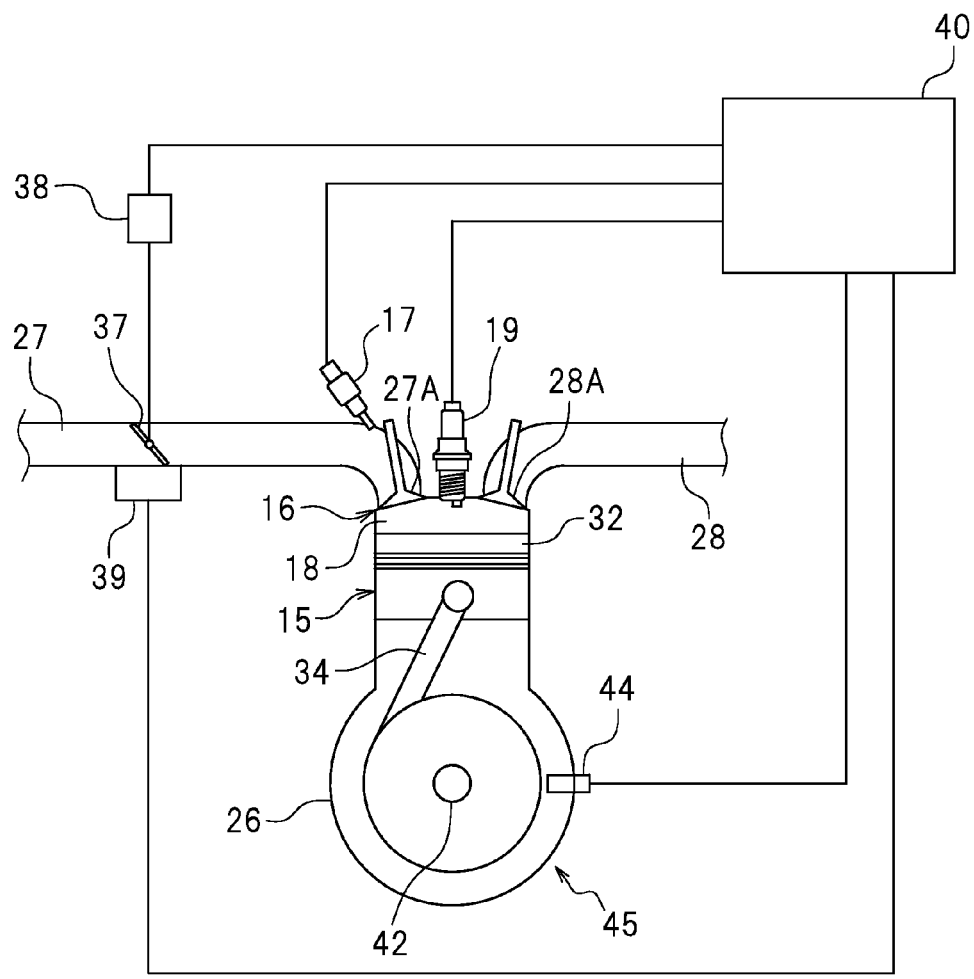
FIG. 2 is a schematic diagram of an engine according to the first preferred embodiment of the present invention.

The motorcycle 1 preferably further includes an engine 45. As illustrated in FIG. 2, the engine 45 preferably includes a crankcase 26, a cylinder body 15, and a cylinder head 16. The engine 45 preferably further includes a piston 32 that reciprocates inside the cylinder body 15, a crankshaft 42, and a connecting rod 34 through which the piston 32 and the crankshaft 42 are connected to each other. The engine 45 is provided with an engine rotational frequency sensor 44 that detects a rotational speed of the crankshaft 42. The term "rotational speed of the crankshaft 42" refers to a rotational frequency of the crankshaft 42 per unit time. Hereinafter, the rotational speed of the crankshaft 42 will simply be referred to as an "engine rotational frequency".

The engine 45 preferably further includes an intake passage 27, an intake valve 27A, an exhaust passage 28, and an exhaust valve 28A. The engine 45 preferably further includes a fuel injection valve 17 and an ignition device 19 that ignites fuel inside a combustion chamber 18.

A throttle valve 37 is disposed in the intake passage 27. The throttle valve 37 is preferably an electronically controlled valve whose opening is controlled by a throttle driving actuator 38. Alternatively, the throttle valve 37 may be a manual valve. The throttle valve 37 is provided with a throttle opening sensor 39 that detects an opening of the throttle valve 37. The throttle opening sensor 39 outputs a throttle opening signal indicative of a throttle opening to an ECU 40.

Figure 3:
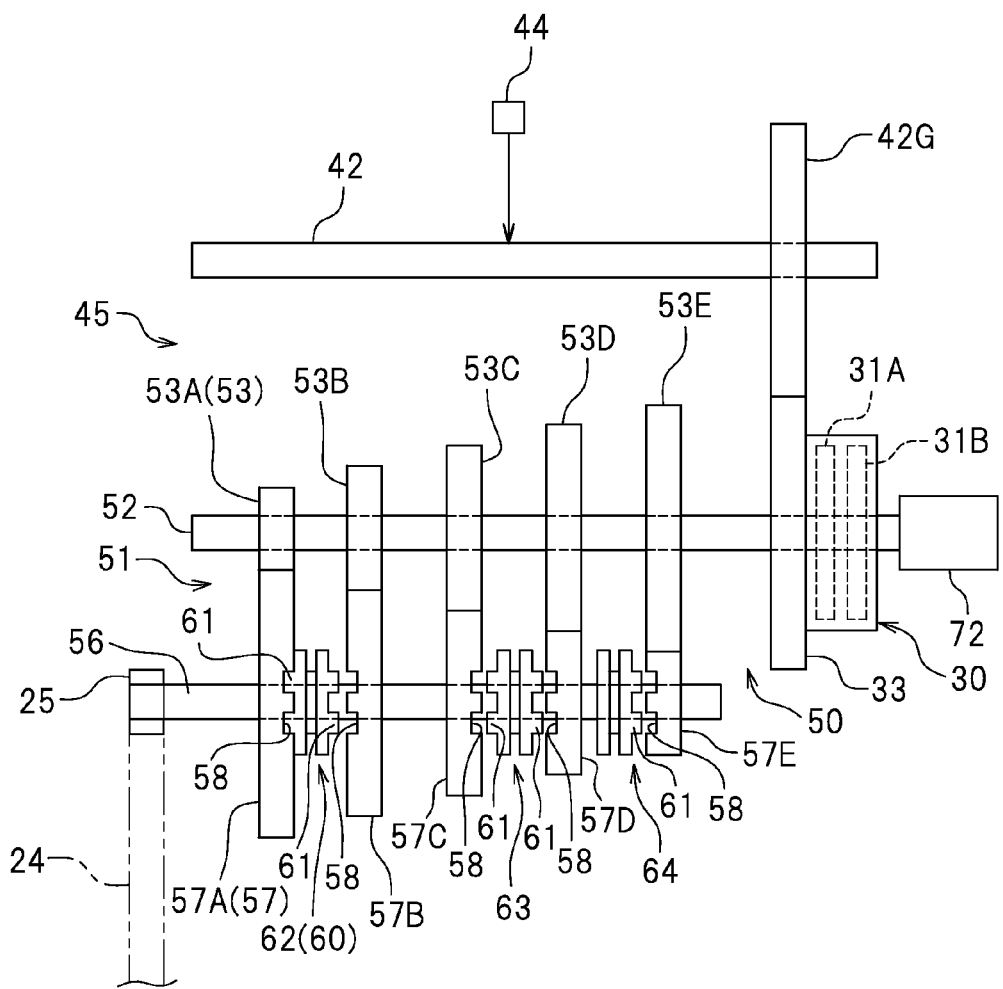
FIG. 3 is a schematic diagram illustrating a structure of a transmission according to the first preferred embodiment of the present invention.

As illustrated in FIG. 3, the engine 45 preferably includes a transmission 50. The transmission 50 preferably includes a clutch 30 to which an engine torque of the crankshaft 42 is transmitted, and a transmission mechanism 51. The transmission mechanism 51 is preferably a "dog clutch type" transmission. The transmission mechanism 51 preferably includes a main shaft 52; main shaft gears 53A, 53B, 53C, 53D, and 53E; a drive shaft 56; drive shaft gears 57A, 57B, 57C, 57D, and 57E; and first, second, and third movable gears 62, 63, and 64. Note that in the following description, the main shaft gears 53A to 53E will also be identified by the generic reference sign "53", the drive shaft gears 57A to 57E will also be identified by the generic reference sign "57", and the first to third movable gears 62 to 64 will also be identified by the generic reference sign "60".

In the present preferred embodiment, the clutch 30 is preferably a single or multiple disc friction clutch, for example. It is to be noted that the clutch 30 is not limited to any particular type of clutch, but may be a clutch other than a friction clutch. The clutch 30 preferably includes a driving member 31A and a driven member 31B. The driving and driven members 31A and 31B are arranged so as to be slidable while being brought into contact with each other. A torque resulting from a frictional force produced between the driving and driven members 31A and 31B is a torque to be transmitted from the driving member 31A to the driven member 31B. Hereinafter, this torque will be referred to as a "clutch transmission torque". The driving and driven members 31A and 31B are arranged so as to be movable both toward and away from each other. When the driving and driven members 31A and 31B have moved toward each other, the clutch 30 is engaged. When the driving and driven members 31A and 31B have moved away from each other, the clutch 30 is disengaged. The driving and driven members 31A and 31B are provided on the main shaft 52. The driving member 31A is arranged so as to be relatively rotatable with respect to the main shaft 52, and the driven member 31B is arranged so as not to be relatively rotatable with respect to the main shaft 52. The driving member 31A is provided with a primary gear 33 that is relatively rotatable with respect to the main shaft 52. The primary gear 33 intermeshes with a crank gear 42G that rotates together with the crankshaft 42. Thus, the driving member 31A rotates together with the crankshaft 42, and receives a torque from the crankshaft 42.

The transmission 50 preferably includes a clutch actuator 72. The clutch actuator 72 causes the clutch 30 to be disengaged and engaged. The clutch actuator 72 is not limited to any particular type of actuator. The clutch actuator 72 may be an electric or hydraulic actuator, for example. Any known actuator may be utilized as the clutch actuator 72.

The main shaft 52 is disposed parallel or substantially parallel with the crankshaft 42. The main shaft 52 rotates together with the driven member 31B of the clutch 30. The number of speeds provided by the transmission mechanism 51 according to the present preferred embodiment is, for example, five in total. The main shaft gears 53A, 53B, 53C, 53D, and 53E correspond to the main shaft gears 53 for first, second, third, fourth, and fifth speeds, respectively. The main shaft gears 53A to 53E are fixed gears that are fixed to the main shaft 52. The main shaft gears 53A to 53E are arranged so as not to be movable in an axial direction of the main shaft 52. The main shaft gears 53A to 53E rotate together with the main shaft 52. The main shaft gears 53A to 53E are disposed from left to right in this order. However, the order in which the main shaft gears 53A to 53E are disposed is not limited to the order mentioned above. The number of speeds provided by the transmission mechanism 51 is not limited to five. Alternatively, the transmission mechanism 51 may include the main shaft gears 53 for the first to Nth speeds (where N is a natural number equal to or greater than 2).

The drive shaft 56 is disposed parallel or substantially parallel with the main shaft 52. The drive shaft gears 57A to 57E are provided on the drive shaft 56. The drive shaft gears 57A, 57B, 57C, 57D, and 57E correspond to the drive shaft gears 57 for the first, second, third, fourth, and fifth speeds, respectively. The drive shaft gears 57A to 57E intermesh with the main shaft gears 53A to 53E, respectively. The drive shaft gears 57A to 57E are arranged so as not to be movable in an axial direction of the drive shaft 56. In the present preferred embodiment, the drive shaft gears 57A to 57E are arranged so as to be relatively rotatable with respect to the drive shaft 56.

The first, second, and third movable gears 62, 63, and 64 are provided on the drive shaft 56. The first, second, and third movable gears 62, 63, and 64 are fitted to the drive shaft 56 by serrations, for example. The first, second, and third movable gears 62, 63, and 64 are movable in the axial direction of the drive shaft 56. The first, second, and third movable gears 62, 63, and 64 rotate together with the drive shaft 56. The first movable gear 62 is disposed between the drive shaft gear 57A and the drive shaft gear 57B. The second movable gear 63 is disposed between the drive shaft gear 57C and the drive shaft gear 57D. The third movable gear 64 is disposed between the drive shaft gear 57D and the drive shaft gear 57E. It is to be noted that the locations of the first, second, and third movable gears 62, 63, and 64 are not limited to any particular locations.

Figure 4:
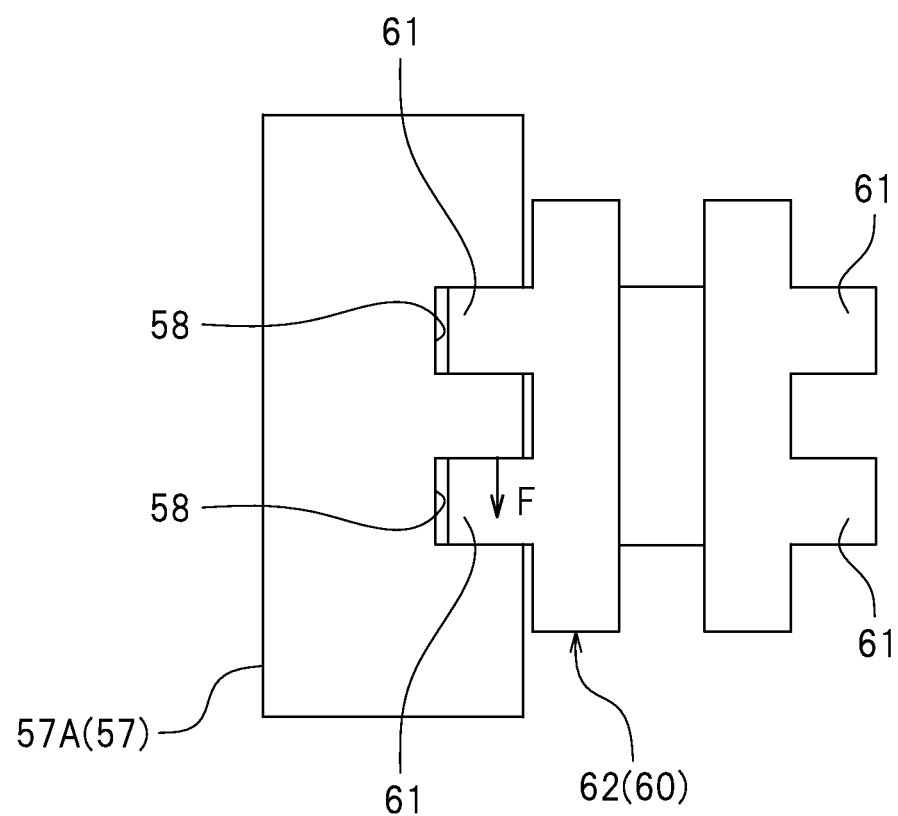
FIG. 4 is a partially enlarged view of FIG. 3.

As illustrated in FIG. 4, the first movable gear 62 preferably includes dog portions 61. Some of the dog portions 61 are provided on a lateral surface of the first movable gear 62 which faces the drive shaft gear 57A. These dog portions 61 protrude toward the drive shaft gear 57A. The drive shaft gear 57A preferably includes dog portions 58. The dog portions 58 are provided on a lateral surface of the drive shaft gear 57A which faces the first movable gear 62. The dog portions 58 are concave in a direction away from the first movable gear 62. The dog portions 61 are arranged so as to be inserted into and removed from the dog portions 58. The dog portions 61 and the dog portions 58 are configured to be engaged with each other. When the dog portions 61 and the dog portions 58 are engaged with each other, the drive shaft 56 receives a torque of the main shaft 52 via the main shaft gear 53A, the drive shaft gear 57A, and the first movable gear 62. Since the first movable gear 62 receives the torque through the drive shaft gear 57A, an engagement force F is produced between the dog portions 58 and the dog portions 61. Thus, resistance is produced when an attempt is made to pull out the dog portions 61 from the dog portions 58. Note that shapes of the dog portions 61 and the dog portions 58 are not limited to any particular shapes, but the dog portions 61 and the dog portions 58 may assume any shapes that allow the dog portions 61 and the dog portions 58 to be engaged with each other. In this preferred embodiment, each dog portion 61 includes a convex portion, and each dog portion 58 includes a concave portion. Alternatively, each dog portion 61 may include a concave portion, and each dog portion 58 may include a convex portion. Optionally, both of the dog portions 61 and the dog portions 58 may include convex portions.

When the dog portions 61 of the first movable gear 62 and the dog portions 58 of the drive shaft gear 57A are engaged with each other, the speed provided by the transmission mechanism 51 is the first speed. Hereinafter, unless otherwise noted, the speed provided by the transmission mechanism 51 will simply be referred to as the "speed". When the speed is the first speed, the drive shaft 56 receives the torque of the main shaft 52 via the main shaft gear 53A, the drive shaft gear 57A, and the first movable gear 62, and thus rotates therewith. The drive shaft gears 57B, 57C, 57D, and 57E intermesh with the main shaft gears 53B, 53C, 53D, and 53E, respectively, and thus rotate therewith. However, the drive shaft gears 57B, 57C, 57D, and 57E idle with respect to the drive shaft 56. As a result, the torque of the main shaft 52 is not transmitted to the drive shaft 56 via the drive shaft gears 57B, 57C, 57D, and 57E.

As illustrated in FIG. 3, the drive shaft gears 57B, 57C, 57D, and 57E also preferably include the dog portions 58. The dog portions 61 are also provided on a lateral surface of the first movable gear 62 which faces the drive shaft gear 57B. The dog portions 61 are also provided on lateral surfaces of the second movable gear 63. The dog portions 61 are also provided on a lateral surface of the third movable gear 64 which faces the drive shaft gear 57E. When the dog portions 61 of the first movable gear 62 and the dog portions 58 of the drive shaft gear 57B are engaged with each other, the speed is changed to the second speed. When the dog portions 61 of the second movable gear 63 and the dog portions 58 of the drive shaft gear 57C are engaged with each other, the speed is changed to the third speed. When the dog portions 61 of the second movable gear 63 and the dog portions 58 of the drive shaft gear 57D are engaged with each other, the speed is changed to the fourth speed. When the dog portions 61 of the third movable gear 64 and the dog portions 58 of the drive shaft gear 57E are engaged with each other, the speed is changed to the fifth speed.

Figure 5:
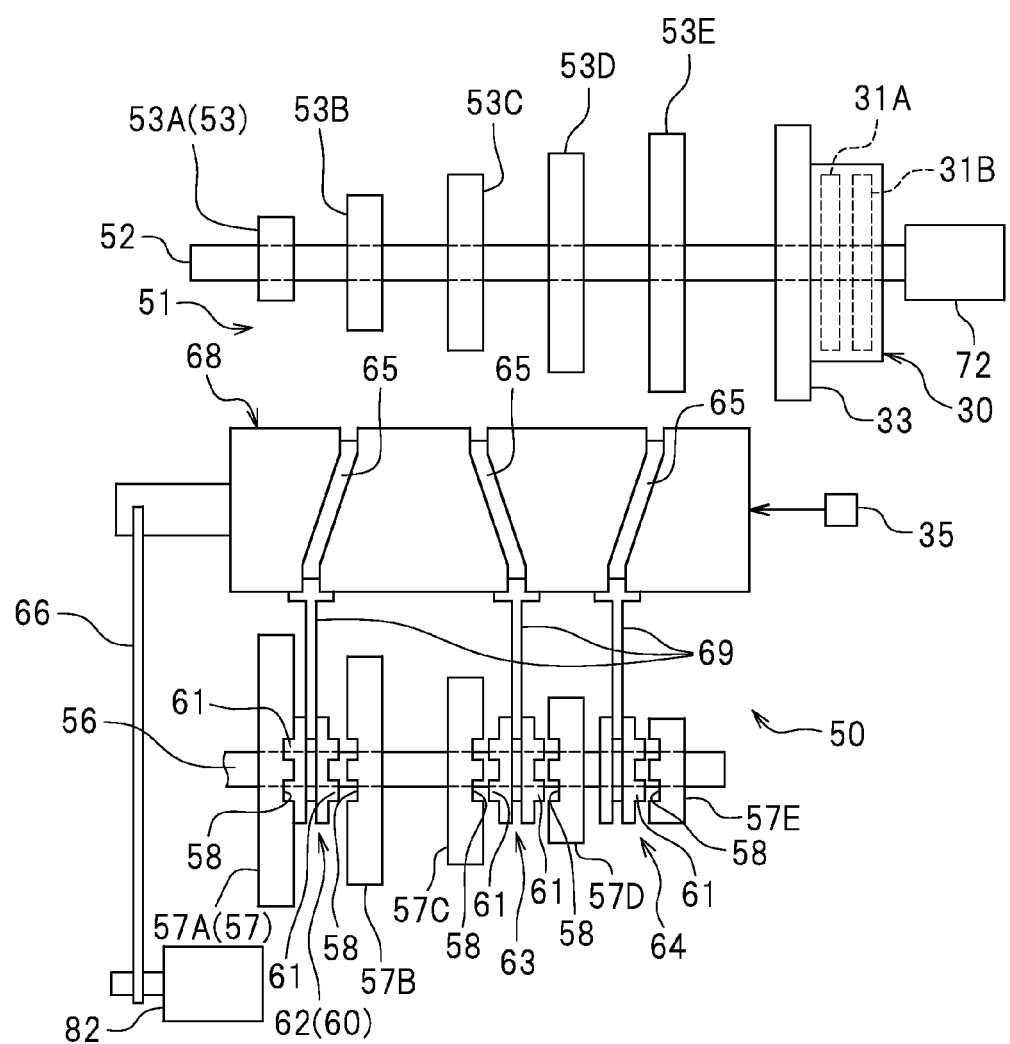
FIG. 5 is a schematic diagram illustrating the structure of the transmission according to the first preferred embodiment of the present invention.

As illustrated in FIG. 5, the transmission 50 preferably includes a shift actuator 82 and a shift drum 68. The shift drum 68 is provided with a plurality of grooves 65 whose axial positions change in accordance with a rotational angle of the shift drum 68. A shift fork 69 is engaged with each groove 65. The shift actuator 82 is connected to the shift drum 68 via a shift rod 66. The shift actuator 82 is arranged to rotate the shift drum 68. When the shift drum 68 is rotated by the shift actuator 82 via the shift rod 66, the shift fork 69 is moved in an axial direction of the shift drum 68. Then, the shift fork 69 moves the first movable gear 62, the second movable gear 63, or the third movable gear 64. In this manner, the shift actuator 82 moves the first, second, and third movable gears 62, 63, and 64 in the axial direction of the drive shaft 56. Thus, the speed provided by the transmission mechanism 51 is selected, and a transmission gear ratio is changed. For example, when an attempt is made to change the speed from the first speed to the second speed, the shift fork 69 moves the first movable gear 62 toward the drive shaft gear 57B. Then, the dog portions 61 of the first movable gear 62 and the dog portions 58 of the drive shaft gear 57A are disengaged from each other, and the dog portions 61 of the first movable gear 62 and the dog portions 58 of the drive shaft gear 57B are engaged with each other. As a result, the speed is changed from the first speed to the second speed. In the present preferred embodiment, the shift actuator 82 is preferably an electric actuator, for example, but the shift actuator 82 is not limited to an electric actuator. Alternatively, any known actuator may be used as the shift actuator 82.

The shift drum 68 is equipped with a gear position sensor 35 that detects the gear speed. The gear speed is detected on the basis of a rotational position of the shift drum 68, for example.

As illustrated in FIG. 3, a sprocket 25 is attached to a left end portion of the drive shaft 56. The sprocket 25 and the rear wheel 23 (see FIG. 1) are connected to each other through a chain 24.

Figure 6:
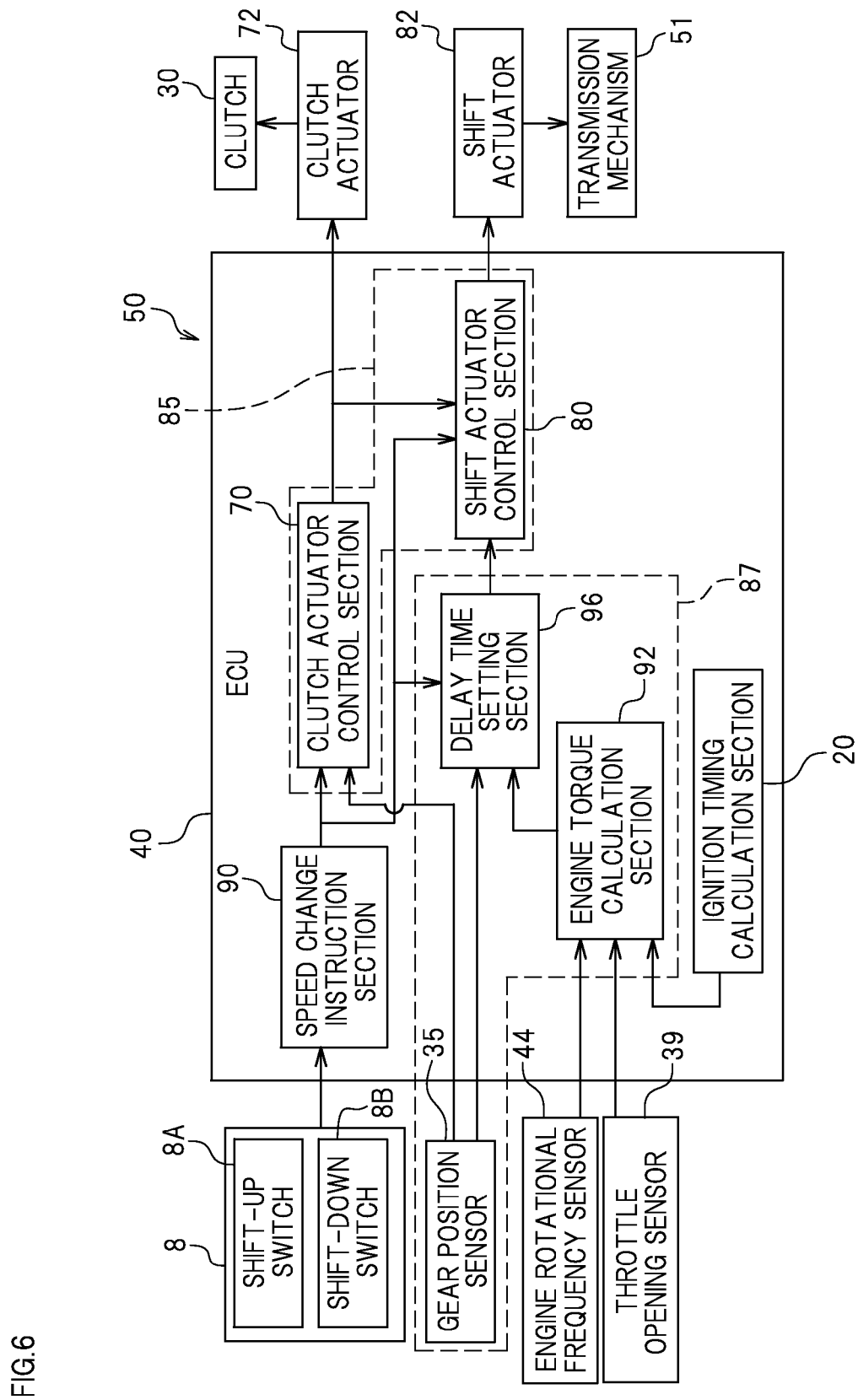
FIG. 6 is a block diagram illustrating main elements of the transmission according to the first preferred embodiment of the present invention.

As illustrated in FIG. 6, a handlebar 4 (see FIG. 1) is provided with a shift switch 8. The shift switch 8 preferably includes a shift-up switch 8A and a shift-down switch 8B. Upon pressing of the shift-up switch 8A by the rider, the transmission 50 performs a shift-up operation to increase the speed by one level. Upon pressing of the shift-down switch 8B by the rider, the transmission 50 performs a shift-down operation to decrease the speed by one level.

The transmission 50 preferably includes the ECU (Electric Control Unit) 40 as a controller programmed and configured to control the clutch actuator 72 and the shift actuator 82, for example. The ECU 40 preferably includes a clutch actuator control section 70, a shift actuator control section 80, a speed change instruction section 90, an engine torque calculation section 92, and a delay time setting section 96. The clutch actuator control section 70 and the shift actuator control section 80 define an actuator controller 85. The delay time setting section 96, the engine torque calculation section 92, and the gear position sensor 35 define a delay time setting device 87.

The speed change instruction section 90 detects pressing of the shift switch 8 by the rider. When the shift switch 8 is pressed by the rider, the speed change instruction section 90 transmits a speed change instruction signal to the clutch actuator control section 70, the shift actuator control section 80, and the delay time setting section 96.

The clutch actuator control section 70 controls the clutch actuator 72. Upon reception of the speed change instruction signal from the speed change instruction section 90, the clutch actuator control section 70 supplies clutch disengagement operation power to the clutch actuator 72. After having received the clutch disengagement operation power, the clutch actuator 72 starts disengagement of the clutch 30. The clutch actuator control section 70 starts engagement of the clutch 30 after the speed change has been completed. Whether or not the speed change has been completed is determined on the basis of a detection result obtained by the gear position sensor 35.

The engine torque calculation section 92 calculates an engine torque on the basis of an engine rotational frequency detected by the engine rotational frequency sensor 44, an opening of the throttle valve 37 (see FIG. 2) detected by the throttle opening sensor 39, and ignition timing information transmitted from an ignition timing calculation section 20. Any known method may be used to calculate an engine torque. The engine torque calculation section 92 preferably includes a memory that stores a map specifying preset relationships between/among engine rotational frequency, throttle opening, ignition timing, and engine torque, for example, and is preferably programmed and configured to calculate an engine torque on the basis of the map. The engine torque calculation section 92 transmits information of the calculated engine torque to the delay time setting section 96. Alternatively, an engine torque may be calculated on the basis of a rotational speed of the rear wheel 23 and the speed provided by the transmission mechanism 51.

When the clutch 30 is engaged, the torque of the crankshaft 42 is transmitted to the drive shaft gear 57. The large engagement force F (see FIG. 4) is produced between the dog portions 58 of the drive shaft gear 57 and the dog portions 61 of the movable gear 60. This engagement force F produces resistance when the movable gear 60 is moved. Hereinafter, unless otherwise noted, the engagement force F between the dog portions 58 of the drive shaft gear 57 and the dog portions 61 of the movable gear 60 will simply be referred to as the "engagement force F". When the clutch 30 remains engaged, it is not easy to disengage the dog portions 58 of the drive shaft gear 57 and the dog portions 61 of the movable gear 60 from each other, thus making it difficult to smoothly move the movable gear 60. To cope with this problem, in the present preferred embodiment, disengagement of the clutch 30 is started before movement of the movable gear 60 is started. In other words, the engagement force F is reduced in advance before movement of the movable gear 60 is started. As used herein, a time period between start of disengagement of the clutch 30 and start of movement of the movable gear 60 will be referred to as a "delay time". The delay time setting section 96 is a section that is configured and programmed to set a delay time.

Upon start of disengagement of the clutch 30, the clutch transmission torque decreases, and therefore, the torque of the main shaft 52 decreases. As a result, the engagement force F is reduced. The engagement force F tends to be reduced as the delay time is increased. The movable gear 60 is preferably moved immediately once the engagement force F has reached a level that the dog portions 58 of the drive shaft gear 57 and the dog portions 61 of the movable gear 60 can be easily disengaged from each other. However, when the engagement force F is at a level that the dog portions 58 of the drive shaft gear 57 and the dog portions 61 of the movable gear 60 cannot be easily disengaged from each other, the movable gear 60 should not be moved forcedly but should be kept on standby until the engagement force F is sufficiently reduced. Therefore, the delay time setting section 96 sets the delay time on the basis of the level of the engagement force F. When the engagement force F is a first engagement force, the delay time setting section 96 sets the delay time to a first delay time, and when the engagement force F is a second engagement force smaller than the first engagement force, the delay time setting section 96 sets the delay time to a second delay time shorter than the first delay time.

The torque of the drive shaft gear 57 increases as the transmission gear ratio is increased. The torque of the drive shaft gear 57 is obtained by multiplying the torque of the main shaft 52 by the transmission gear ratio. Even when the torque of the main shaft 52 remains the same, the torque of the drive shaft gear 57 varies depending on the speed. In the present preferred embodiment, the torque of the drive shaft gear 57A for the first speed is greater than the torque of the drive shaft gear 57B for the second speed. Therefore, the lower the speed, the greater the engagement force F. Hence, in the present preferred embodiment, the delay time setting section 96 sets the delay time on the basis of the speed.

Static friction is produced between the driving and driven members 31A and 31B of the clutch 30. When the static friction is equal to or greater than a given value, the driving member 31A slides with respect to the driven member 31B. This given value is referred to as "maximum static friction". Upon start of disengagement of the clutch 30, the driving and driven members 31A and 31B move away from each other, and thus the maximum static friction gradually decreases. When the maximum static friction has decreased and become equal to the static friction, the driving member 31A starts to slide with respect to the driven member 31B, and the clutch transmission torque decreases. When the clutch transmission torque decreases, the torque of the main shaft 52 decreases. As a result, the engagement force F is reduced, thus enabling dog disengagement by the shift actuator 82.

When the engine torque prior to speed change is large, a driving force of the driving member 31A is large, and therefore, the static friction between the driving and driven members 31A and 31B is large. Hence, shortly after start of disengagement of the clutch 30, the maximum static friction becomes equal to the static friction, and the driving member 31A slides with respect to the driven member 31B. As a result, the clutch transmission torque is reduced, and the engagement force F is reduced. However, when the engine torque prior to speed change is small, the driving force of the driving member 31A is small, and therefore, the static friction between the driving and driven members 31A and 31B is small. Hence, a time required for the maximum static friction to become equal to the static friction after start of disengagement of the clutch 30 is increased. As a result, a time required for the engagement force F to decrease is increased. To cope with this problem, in the present preferred embodiment, the delay time setting section 96 sets the delay time on the basis of the engine torque.

Note that when the engine torque is smaller, i.e., when the engine torque is less than a given value, the maximum static friction might not decrease to become equal to the static friction and the driving member 31A might not slide with respect to the driven member 31B during a time period between start of disengagement of the clutch 30 and completion of the disengagement. In such a case, the engagement force F cannot be reduced by sliding the driving member 31A with respect to the driven member 31B. To cope with such a problem, in the present preferred embodiment, when the engine torque is less than the given value, control such as ignition delay control by which the engine torque itself is reduced is performed so as to decrease the clutch transmission torque. In other words, the engagement force F is reduced by decreasing the engine torque itself.

Figure 7:
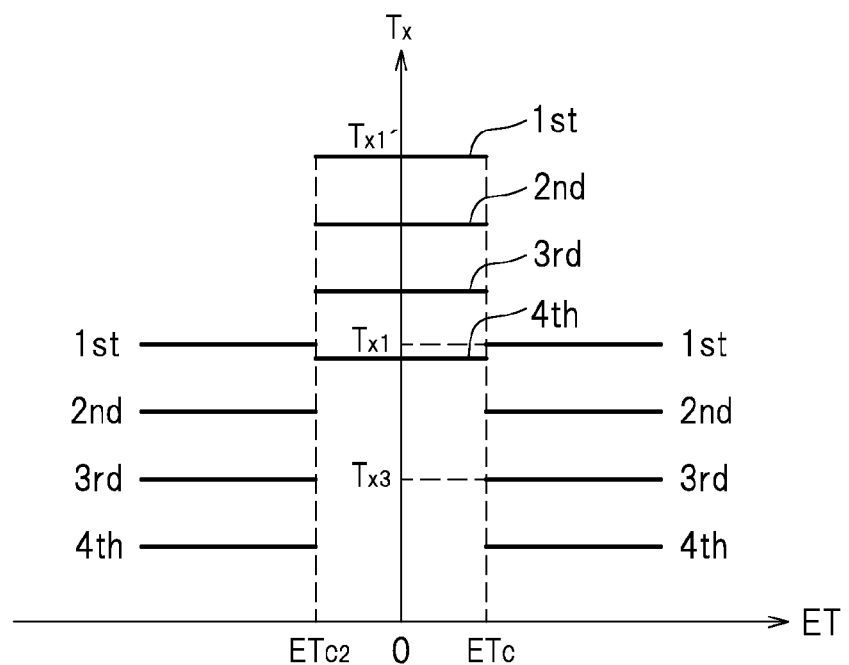
FIG. 7 is a map of delay times according to the first preferred embodiment of the present invention.

In the present preferred embodiment, the delay time setting section 96 preferably includes a memory that stores a map of delay times. The map specifies delay times on the basis of the engine torque and the speeds provided by the transmission mechanism 51. FIG. 7 is a diagram illustrating the delay times specified by the map. The reference sign "$T_x$" denotes the delay time. The reference sign "ET" denotes the engine torque. The reference signs "1st", "2nd", "3rd" and "4th" denote the speeds prior to speed change, and correspond to the first, second, third, and fourth speeds, respectively. Although FIG. 7 illustrates the delay times when a shift-up operation is performed, the delay times may be set in a similar manner also when a shift-down operation is performed. As illustrated in FIG. 7, the delay time $T_x$ is set so that the lower the speed prior to speed change, the longer the delay time $T_x$. Assuming that the speeds prior to speed change are pth and qth speeds (where p is a natural number equal to or greater than 1 and equal to or smaller than N−1, and q is a natural number greater than p and equal to or smaller than N) and that the delay times for the pth and qth speeds are tp and tq, respectively, the delay times tp and tq are set so that tp>tq. When the engine torque ET is positive, the delay time $T_x$ is set so that the delay time $T_x$ is longer when the engine torque ET is less than a given value $ET_c$ than when the engine torque ET is equal to or greater than the given value $ET_c$. It is conceivable that speed change may be performed when the engine torque is negative. When the engine torque ET is negative, the delay time $T_x$ is set so that the delay time $T_x$ is longer when the engine torque ET is greater than a given value $ET_{c2}$ than when the engine torque ET is equal to or less than the given value $ET_{c2}$. An absolute value of the given value $ET_c$ when the engine torque is positive and an absolute value of the given value $ET_{c2}$ when the engine torque is negative may be equal to each other or may be different from each other. The same goes for FIGS. 11 and 15 which will be described below.

Note that the diagram illustrated in FIG. 7 is provided by way of example only. Although the delay time $T_x$ is set on the basis of both of the speed and the engine torque in this example, the delay time $T_x$ may be set on the basis of only the speed or on the basis of only the engine torque. In the present preferred embodiment, the delay times are presented in the following order, from longest to shortest: the delay time for the first speed, the delay time for the second speed, the delay time for the third speed, and the delay time for the fourth speed. Alternatively, the delay times for the speeds next to each other may be equal to each other. For example, the delay time for the third speed and the delay time for the fourth speed may be equal to each other. In the present preferred embodiment, two types of delay times are set on the basis of the magnitude of the engine torque, but three or more types of delay times may be set on the basis of the magnitude of the engine torque. The delay time may be held constant for some of the speeds irrespective of the magnitude of the engine torque. The number of types of delay times based on the magnitude of the engine torque may vary in accordance with the number of speeds.

The delay time setting section 96 sets the delay time on the basis of the speed provided by the transmission mechanism 51 and detected by the gear position sensor 35, information of the engine torque received from the engine torque calculation section 92, and the above-mentioned map. The delay time setting section 96 transmits information concerning the set delay time to the shift actuator control section 80.

The shift actuator control section 80 controls the shift actuator 82. After having received the speed change instruction signal from the speed change instruction section 90, the shift actuator control section 80 supplies shift operation power to the shift actuator 82. After having received the shift operation power, the shift actuator 82 starts movement of the movable gear 60. In this case, the shift actuator 82 is controlled so as to start movement of the movable gear 60 after a lapse of the delay time, set by the delay time setting section 96, from start of disengagement of the clutch 30.

Note that there is a time lag between transmission of the speed change instruction signal from the speed change instruction section 90 and start of movement of the movable gear 60. This time lag is constant irrespective of the speed. There is a time lag also between transmission of the speed change instruction signal from the speed change instruction section 90 and start of disengagement of the clutch 30. This time lag is also constant. Instead of a time period between start of disengagement of the clutch 30 and start of movement of the movable gear 60, a time period between transmission of the speed change instruction signal from the speed change instruction section 90 and supply of the shift operation power from the shift actuator control section 80 may be used as the delay time. Even in that case, the control described below is carried out. Any time period equivalent to a time period between start of disengagement of the clutch 30 and start of movement of the movable gear 60 can be used as the delay time, and can be regarded as a time period between start of disengagement of the clutch 30 and start of movement of the movable gear 60.

Figure 8:
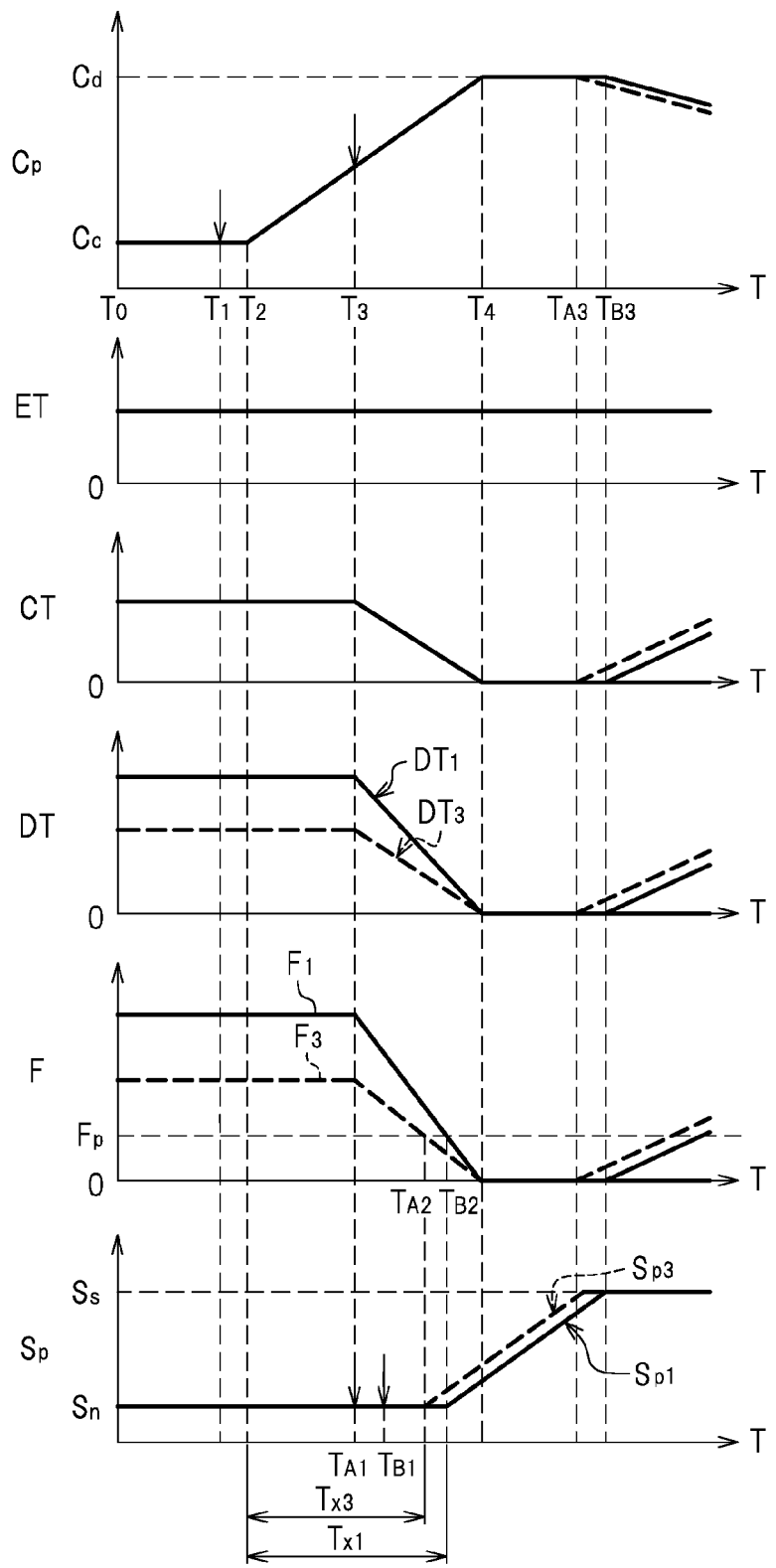
FIG. 8 is an example of a timing chart for transmission control according to the first preferred embodiment of the present invention.

Next, exemplary transmission control according to the present preferred embodiment will be described with reference to FIG. 8. FIG. 8 is a timing chart for a shift-up operation, but the transmission control according to the present preferred embodiment may also be performed for a shift-down operation. The same goes for other preferred embodiments described below. In FIG. 8, each solid line represents a shift-up operation to change the speed from the first speed to the second speed, and each broken line represents a shift-up operation to change the speed from the third speed to the fourth speed.

In FIG. 8, $C_p$ represents a clutch position. $C_c$ represents a position at which the clutch 30 is engaged (which will hereinafter be referred to as an "engaged position"), and $C_d$ represents a position at which the clutch 30 is disengaged (which will hereinafter be referred to as a "disengaged position"). The clutch position $C_p$ changes between the engaged position $C_c$ and the disengaged position $C_d$. ET represents a torque of the crankshaft 42, i.e., an engine torque. For the sake of simplification of description, the following description is made on the assumption that the engine torque ET is constant. CT represents a clutch transmission torque. DT represents a torque of the drive shaft 56. $DT_1$ represents the torque of the drive shaft 56 at the time of the shift-up operation to change the speed from the first speed to the second speed, and $DT_3$ represents the torque of the drive shaft 56 at the time of the shift-up operation to change the speed from the third speed to the fourth speed. F represents an engagement force between the dog portions 58 of the drive shaft gear 57 and the dog portions 61 of the movable gear 60. $S_p$ represents a position of the movable gear 60 driven by the shift actuator 82. Hereinafter, the position of the movable gear 60 driven by the shift actuator 82 will be referred to as a "gear position sensor position". $S_n$ represents the gear position sensor position before speed change, and $S_s$ represents the gear position sensor position after speed change. For example, when the speed is changed from the first speed to the second speed, $S_n$ corresponds to a position at which the dog portions 61 of the first movable gear 62 and the dog portions 58 of the drive shaft gear 57A are engaged with each other, and $S_s$ corresponds to a position at which the dog portions 61 of the first movable gear 62 and the dog portions 58 of the drive shaft gear 57B are engaged with each other. $S_{p1}$ represents the gear position sensor position at the time of the shift-up operation to change the speed from the first speed to the second speed, and $S_{p3}$ represents the gear position sensor position at the time of the shift-up operation to change the speed from the third speed to the fourth speed. T represents time.

First, the shift-up operation to change the speed from the first speed to the second speed will be described. At a time point $T_1$ when the motorcycle 1 is traveling at the first speed, the rider operates the shift-up switch 8A. Thus, the speed change instruction section 90 transmits the speed change instruction signal to the clutch actuator control section 70, the shift actuator control section 80, and the delay time setting section 96. Upon reception of the speed change instruction signal from the speed change instruction section 90, the delay time setting section 96 sets a delay time $T_{x1}$. The delay time $T_{1x}$ is set on the basis of the speed (i.e., the first speed in this example) provided by the transmission mechanism 51 and detected by the gear position sensor 35 when the speed change instruction signal is received, information of the engine torque ET received from the engine torque calculation section 92 when the speed change instruction signal is received, and the map. The delay time setting section 96 transmits information concerning the set delay time $T_{1x}$ to the shift actuator control section 80.

Upon reception of the speed change instruction signal from the speed change instruction section 90, the clutch actuator control section 70 supplies the clutch disengagement operation power to the clutch actuator 72. At a time point $T_2$, disengagement of the clutch 30 is started. Thus, the clutch position starts to change from the engaged position $C_c$ to the disengaged position $C_d$.

At a time point $T_3$, the clutch 30 starts to slide and enters a "half clutch state". As used herein, the term "half clutch state" refers to a state in which the torque of the crankshaft 42 is transmitted to the main shaft 52 via the clutch 30 but the driving and driven members 31A and 31B of the clutch 30 relatively rotate with respect to each other. After the time point $T_3$, the clutch transmission torque CT decreases. The drive shaft 56 rotates together with the main shaft 52 via the main shaft gear 53A and the drive shaft gear 57A, and therefore, the drive shaft torque DT will also decrease in accordance with the decrease in the clutch transmission torque CT. An engagement force $F_1$ between the dog portions 61 of the first movable gear 62 and the dog portions 58 of the drive shaft gear 57A will also decrease (see the time points $T_3$ to $T_4$).

Referring to FIG. 8, $F_p$ represents an engagement force that allows the engagement between the dog portions 61 of the movable gear 60 and the dog portions 58 of the drive shaft gear 57 to be released by the shift actuator 82. At a time point $T_{B2}$ at which the delay time $T_{x1}$ has elapsed from the time point $T_2$, the engagement force $F_1$ reaches $F_p$. At a time point $T_{B1}$, the shift actuator control section 80 supplies the shift operation power to the shift actuator 82 so as to start movement of the first movable gear 62 at the time point $T_{B2}$. Thus, at the time point $T_{B2}$, the shift actuator 82 starts to move the first movable gear 62 from the gear position sensor position $S_n$ for the first speed toward the gear position sensor position $S_s$ for the second speed.

At a time point $T_{B3}$, the first movable gear 62 reaches the gear position sensor position $S_s$ for the second speed, so that the dog portions 61 of the first movable gear 62 and the dog portions 58 of the drive shaft gear 57B are engaged with each other. As a result, the speed provided by the transmission mechanism 51 is changed from the first speed to the second speed. In this case, based on the speed detected by the gear position sensor 35, the clutch actuator control section 70 determines that the change of the speed provided by the transmission mechanism 51 has been completed. Then, the clutch actuator control section 70 drives the clutch actuator 72 to start engagement of the clutch 30. This is how shift-up control to change the speed from the first speed to the second speed is performed.

Shift-up control to change the speed from the third speed to the fourth speed is also performed in a similar manner. However, as illustrated in FIG. 7, the delay time set for the shift-up control to change the speed from the third speed to the fourth speed is shorter than the delay time set for the shift-up control to change the speed from the first speed to the second speed. As illustrated in FIG. 8, a delay time $T_{x3}$ for the shift-up control to change the speed from the third speed to the fourth speed is shorter than the delay time $T_{x1}$ for the shift-up control to change the speed from the first speed to the second speed. At a time point $T_{A2}$ at which the delay time $T_{x3}$ has elapsed from the time point $T_2$ at which disengagement of the clutch 30 has started, an engagement force $F_3$ between the dog portions 61 of the second movable gear 63 and the dog portions 58 of the drive shaft gear 57C reaches the disengageable engagement force $F_p$. At a time point $T_{A1}$, the shift actuator control section 80 supplies the shift operation power to the shift actuator 82 so as to start movement of the second movable gear 63 at the time point $T_{A2}$. Thus, at the time point $T_{A2}$, the shift actuator 82 starts to move the second movable gear 63 from the gear position sensor position $S_n$ for the third speed toward the gear position sensor position $S_s$ for the fourth speed.

When the speed provided by the transmission mechanism 51 has been changed to the fourth speed at a time point $T_{A3}$, the clutch actuator control section 70 drives the clutch actuator 72 to start engagement of the clutch 30.

In the conventional technique, the delay time is set uniformly. If the delay time is uniformly set to $T_{x3}$ both when the speed is the first speed and when the speed is the third speed, movement of the movable gear 60 will always be started at the time point $T_{A2}$. In that case, when the speed is the third speed, dog disengagement is efficiently performed. However, when the speed is the first speed, the engagement force $F_1$ is still not equal to or smaller than $F_p$ at the time point $T_{A2}$. Therefore, movement of the movable gear 60 does not start even though driving of the clutch actuator 72 and the shift actuator 82 has been started. Hence, the rider feels that the speed change time is long.

If the delay time is uniformly set to $T_{x1}$ both when the speed is the first speed and when the speed is the third speed, movement of the movable gear 60 will always be started at the time point $T_{B2}$. In that case, when the speed is the first speed, dog disengagement is efficiently performed. However, when the speed is the third speed, the engagement force $F_3$ is already equal to or smaller than $F_p$ at the time point $T_{B2}$. Even if the shift actuator 82 is driven at an earlier time, completion of operation of the shift actuator 82 will be delayed, although dog disengagement is performed. As a result, the rider feels that the speed change time is long.

To cope with the above-mentioned problems, in the present preferred embodiment, the delay time setting section 96 sets a short delay time when the engagement force F is small. Therefore, the shift actuator 82 is actuated at an earlier time, so that operation of the shift actuator 82 is completed early. Thus, the speed change time perceived by the driver is reduced. The delay time setting section 96 sets a long delay time when the engagement force F is large. Thus, the shift actuator 82 is prevented from being operated for a period of time longer than necessary. As a result, the speed change time perceived by the driver is reduced.

It is difficult to directly detect the magnitude of the engagement force F. In the present preferred embodiment, attention is given to the fact that there is a correlation between the speed and the engagement force F, and therefore, the delay time to be set is increased as the speed is reduced. Thus, the delay time is appropriately set in accordance with the engagement force F without having to directly detect the magnitude of the engagement force F. By setting the delay time on the basis of the speed, the speed change time perceived by the driver is reduced.

Figure 9:
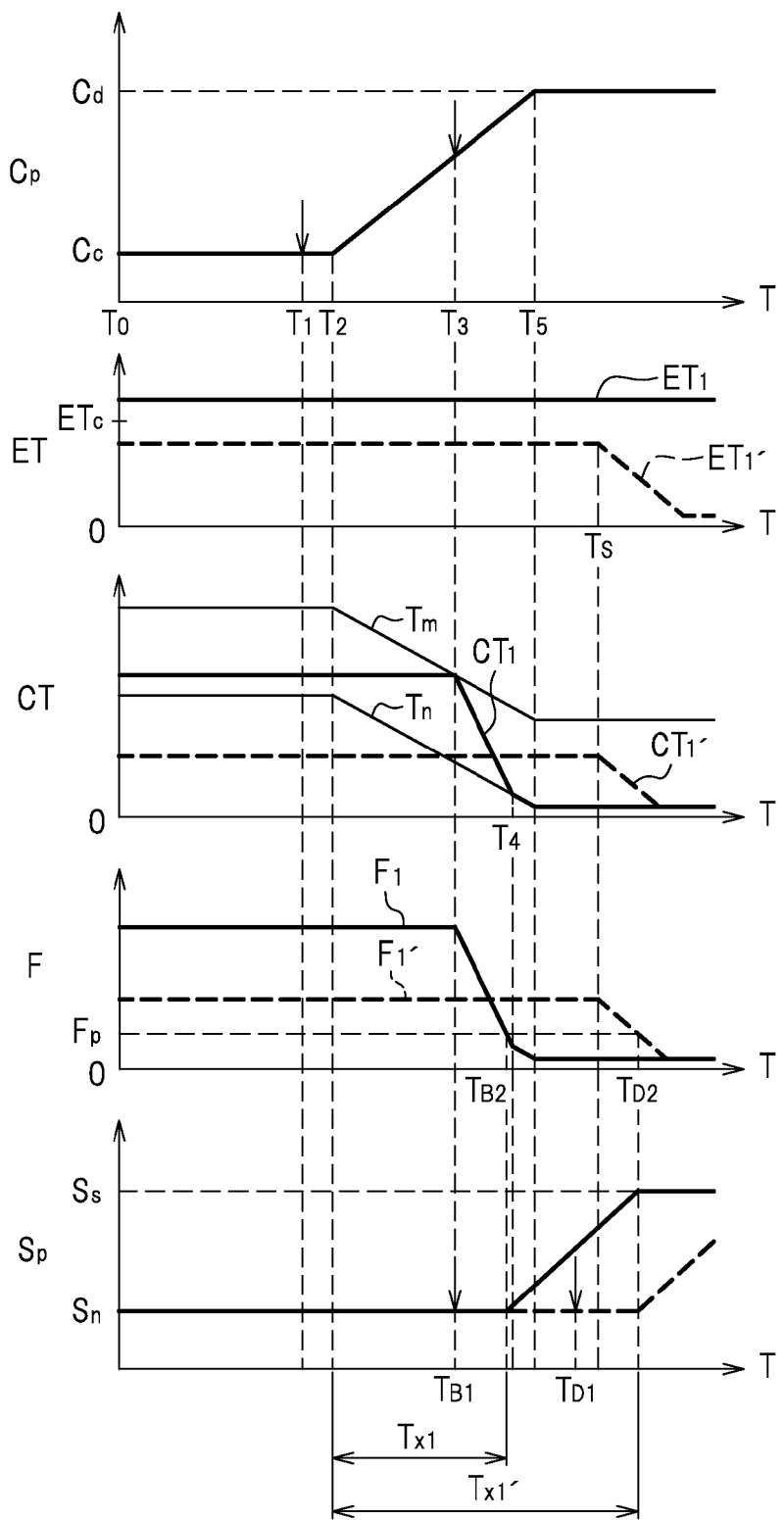
FIG. 9 is another example of a timing chart for transmission control according to the first preferred embodiment of the present invention.

FIG. 9 is a timing chart illustrating another exemplary transmission control according to the present preferred embodiment. In FIG. 9, each solid line represents a shift-up operation to change the speed from the first speed to the second speed when the engine torque ET is equal to or greater than the given value $ET_c$, and each broken line represents a shift-up operation to change the speed from the first speed to the second speed when the engine torque ET is less than the given value $ET_c$.

The rider operates the shift-up switch 8A at the time point $T_1$, and then disengagement of the clutch 30 starts at the time point $T_2$. The clutch 30 starts to move from the engaged position $C_c$ to the disengaged position $C_d$. A maximum static friction torque $T_m$ and a dynamic friction torque $T_n$ will decrease in accordance with the movement of the clutch 30 (see the time points $T_2$ to $T_5$). As used herein, a torque received by the driven member 31B of the clutch 30 from the driving member 31A thereof will be referred to as a "static friction torque". The term "static friction torque" is synonymous with the term "clutch transmission torque". The maximum static friction torque $T_m$ is the static friction torque when the driving member 31A starts to slide with respect to the driven member 31B. The dynamic friction torque $T_n$ is the torque received by the driven member 31B from the driving member 31A while the driving member 31A slides with respect to the driven member 31B.

When the engine torque is $ET_1$ which is equal to or greater than the given value $ET_c$, the maximum static friction torque $T_m$ is equal to a clutch transmission torque $CT_1$ at the time point $T_3$. Therefore, the clutch 30 starts to slide and enters the half clutch state. After the time point $T_3$, the clutch transmission torque $CT_1$ further decreases, and then the clutch transmission torque $CT_1$ and the dynamic friction torque $T_n$ become equal to each other (see the time point $T_4$). The engagement force $F_1$ also decreases in accordance with the decrease in the clutch transmission torque $CT_1$ (see the time points $T_3$ to $T_5$).

The engine torque $ET_1$ is equal to or greater than the given value $ET_c$, and therefore, the short delay time $T_{x1}$ is set (see FIG. 7). At the time point $TB_2$ at which the delay time $T_{x1}$ has elapsed from the time point $T_2$, the engagement force $F_1$ reaches the disengageable engagement force $F_p$. At the time point $TB_1$, the shift actuator control section 80 supplies the shift operation power to the shift actuator 82 so as to start movement of the movable gear 60 at the time point $TB_2$. Thus, at the time point $TB_2$, the shift actuator 82 starts to move the movable gear 60 from the gear position sensor position $S_n$ for the first speed toward the gear position sensor position $S_s$ for the second speed.

When the engine torque is $ET_{1'}$, which is less than the given value $ET_c$, the static friction torque of the clutch 30, i.e., the clutch transmission torque $CT_{1'}$, is small. Upon start of disengagement of the clutch 30, the maximum static friction torque $T_m$ decreases, but the maximum static friction torque $T_m$ will not be smaller than the clutch transmission torque $CT_{1'}$ even at the time point $T_5$ at which the clutch 30 is disengaged. Hence, an engagement force $F_{1'}$ cannot be reduced by merely disengaging the clutch 30. To cope with this, at a time point $T_s$, the ECU 40 performs control to decrease the engine torque $ET_{1'}$. The ECU 40 performs, for example, control such as ignition delay control of the ignition device 19, fuel injection amount reduction control by the fuel injection valve 17, or control to reduce the opening of the throttle valve 37. As a result, the clutch transmission torque $CT_{1'}$ is decreased.

The engine torque $ET_{1'}$ prior to speed change is less than the given value $ET_c$, and therefore, a long delay time $T_{x1'}$ is set (see FIG. 7). At a time point $T_{D2}$ at which the delay time $T_{x1'}$ has elapsed from the time point $T_2$, the engagement force $F_{1'}$ reaches the disengageable engagement force $F_p$. At a time point $T_{D1}$, the shift actuator control section 80 supplies the shift operation power to the shift actuator 82 so as to start movement of the movable gear 60 at the time point $T_{D2}$. Thus, at the time point $T_{D2}$, the shift actuator 82 starts to move the movable gear 60 from the gear position sensor position $S_n$ for the first speed toward the gear position sensor position $S_s$ for the second speed.

According to the present preferred embodiment, the delay time setting section 96 is programmed and configured to set the delay time on the basis of the engine torque ET. When the engine torque ET is large and the engagement force F is reduced relatively early by disengaging the clutch 30, a short delay time is set. Thus, the shift actuator 82 is actuated at an earlier time, and the operation of the shift actuator 82 is completed early. When the engine torque ET is small and the engagement force F cannot be reduced early by merely disengaging the clutch 30, a long delay time is set in consideration of a period of time required to reduce the clutch transmission torque CT by the control to reduce the engine torque ET. Thus, the shift actuator 82 is prevented from being operated for a period of time longer than necessary. Hence, the speed change time perceived by the driver is reduced.

In the above-mentioned example where the engine torque is $ET_{1'}$, the engagement force F cannot be reduced early by merely disengaging the clutch 30. However, even when the engagement force F is reduced to $F_p$ by merely disengaging the clutch 30, a long delay time may be set if it takes a long time for the engagement force F to reach $F_p$. In other words, setting a long delay time is not limited to the case where the engagement force F cannot be reduced early by merely disengaging the clutch 30.

Second Preferred Embodiment

Figure 10:
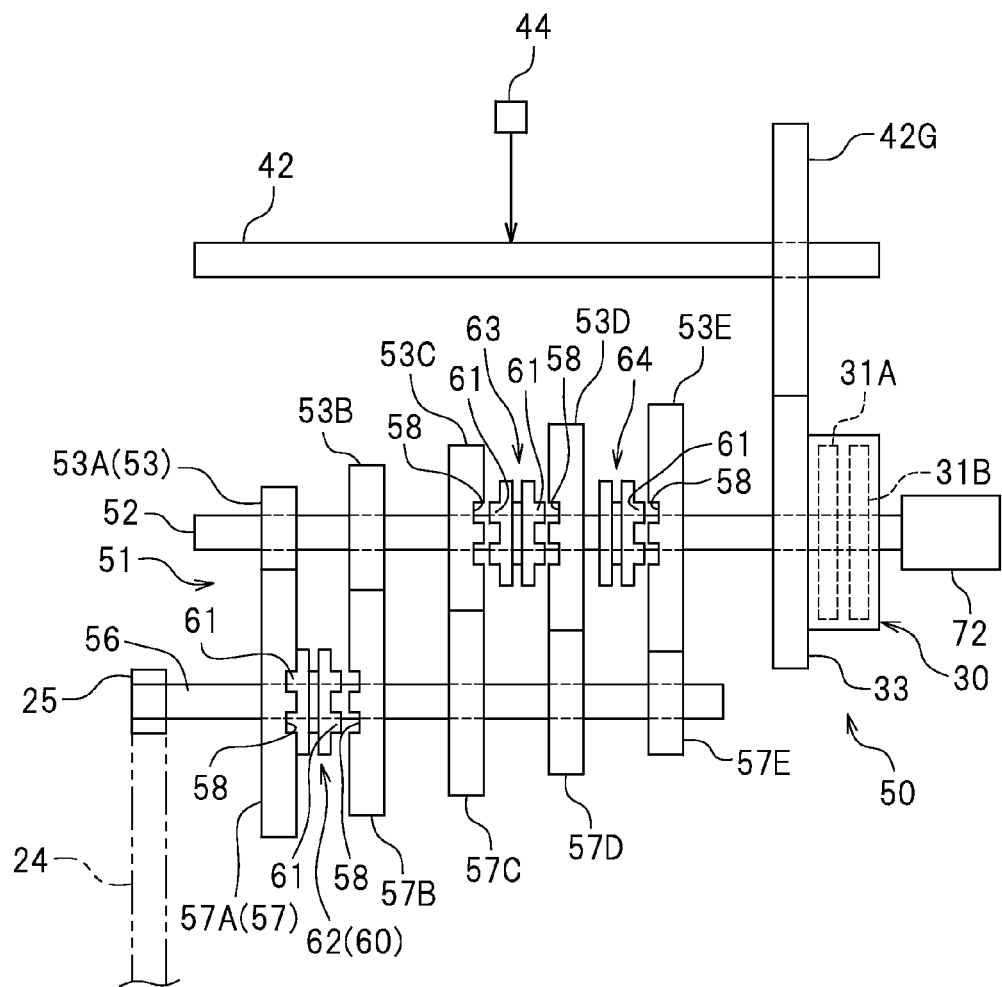
FIG. 10 is a schematic diagram illustrating a structure of a transmission according to a second preferred embodiment of the present invention.

In the first preferred embodiment, all the movable gears 62 to 64 preferably are provided on the drive shaft 56. As illustrated in FIG. 10, in the second preferred embodiment, at least one of the movable gears 62 to 64 (e.g., the first movable gear 62) is provided on the drive shaft 56, and the other movable gears (e.g., the movable gears 63 and 64) are provided on the main shaft 52. In the following description, elements similar to those in the first preferred embodiment are identified by the same reference signs, and description thereof will be omitted.

In the present preferred embodiment, the second and third movable gears 63 and 64 are provided on the main shaft 52. The second and third movable gears 63 and 64 are movable in the axial direction of the main shaft 52. The second and third movable gears 63 and 64 are not rotatable with respect to the main shaft 52, but are rotated together with the main shaft 52. The second movable gear 63 is disposed between the main shaft gear 53C for the third speed and the main shaft gear 53D for the fourth speed. The third movable gear 64 is disposed between the main shaft gear 53D for the fourth speed and the main shaft gear 53E for the fifth speed. It is to be noted that the locations of the first, second, and third movable gears 62, 63, and 64 are not limited to any particular locations.

The main shaft gears 53C to 53E are not movable in the axial direction of the main shaft 52. The main shaft gears 53C to 53E are configured so as to be rotatable with respect to the main shaft 52. The main shaft gears 53C to 53E are provided with the dog portions 58.

The shift actuator 82 moves the first movable gear 62 in the axial direction of the drive shaft 56. The shift actuator 82 moves the second and third movable gears 63 and 64 in the axial direction of the main shaft 52.

As described in the first preferred embodiment, the torque obtained by multiplying the torque of the main shaft 52 by the transmission gear ratio is applied to the drive shaft gear 57. When the dog portions 61 of the movable gear 60 and the dog portions 58 of the drive shaft gear 57 are engaged with each other, the engagement force F between the dog portions 61 and the dog portions 58 varies depending on the speed provided by the drive shaft gear 57. However, the torque of the main shaft 52 does not vary depending on the speed. When the dog portions 61 of the movable gear 60 and the dog portions 58 of the main shaft gear 53 are engaged with each other, the engagement force F between the dog portions 61 and the dog portions 58 is not dependent on the speed provided by the main shaft gear 53 if distances between an axial center of the movable gear 60 and the dog portions 61 of the movable gear 60 remain the same. The engagement force F between the dog portions 61 of the movable gear 60 and the dog portions 58 of the main shaft gear 53 is smaller than the engagement force F between the dog portions 61 of the movable gear 60 and the dog portions 58 of the drive shaft gear 57.

Figure 11:
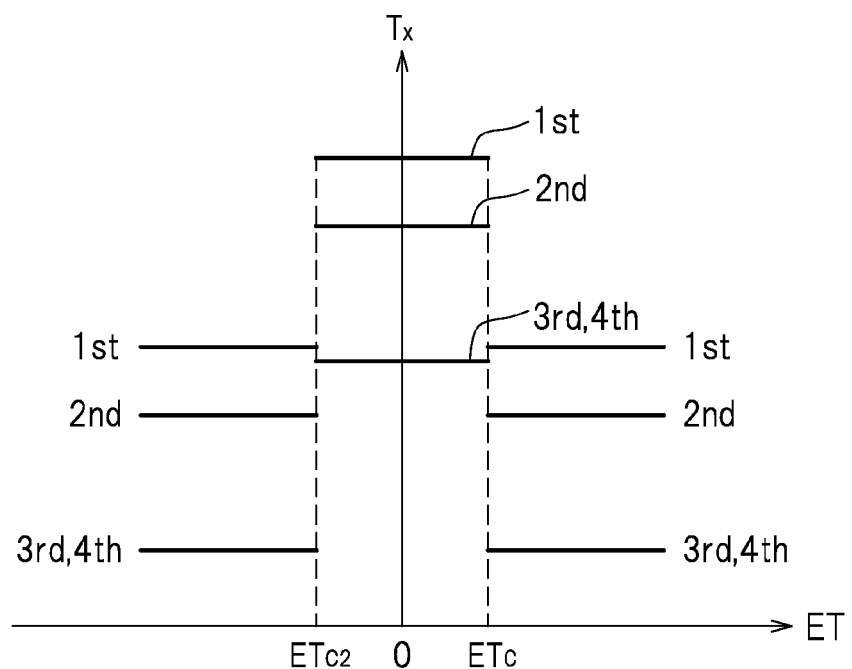
FIG. 11 is a map of delay times according to the second preferred embodiment of the present invention.

FIG. 11 is a diagram illustrating the delay time $T_x$ according to the present preferred embodiment. The delay time $T_x$ is set to be longer when the dog portions 58 to be engaged with the dog portions 61 of the movable gear 60 are the dog portions 58 of the drive shaft gear 57 than when the dog portions 58 to be engaged with the dog portions 61 of the movable gear 60 are the dog portions 58 of the main shaft gear 53. The delay time setting section 96 is programmed and configured to set the delay time $T_x$ on the basis of whether the gear, including the dog portions 58 to be disengaged from the dog portions 61 of the movable gear 60, is the drive shaft gear 57 or the main shaft gear 53. In the present preferred embodiment, the first movable gear 62 is provided on the drive shaft 56, and the second and third movable gears 63 and 64 are provided on the main shaft 52. Therefore, the delay time $T_x$ for the third and fourth speeds is set to be shorter than the delay time $T_x$ for the first and second speeds. The delay time $T_x$ for the third speed and the delay time $T_x$ for the fourth speed are preferably equal to each other. Assuming that the speeds provided by the main shaft gears 53, including the dog portions 58 to be disengaged from the dog portions 61 of the movable gear 60, are pth and qth speeds (where p is a natural number equal to or greater than 1 and equal to or smaller than N−1, and q is a natural number greater than p and equal to or smaller than N) and that the delay times for the pth and qth speeds are tp and tq, respectively, the delay times tp and tq are set so that tp=tq. Similarly to the first preferred embodiment, assuming that the engine torque ET is positive, the delay time $T_x$ is set to be longer when the engine torque ET is smaller than the given value $ET_c$ than when the engine torque ET is equal to or greater than the given value $ET_c$. Assuming that the engine torque ET is negative, the delay time $T_x$ is set to be longer when the engine torque ET is greater than the given value $ET_{c2}$ than when the engine torque ET is equal to or smaller than the given value $ET_{c2}$.

Figure 12:
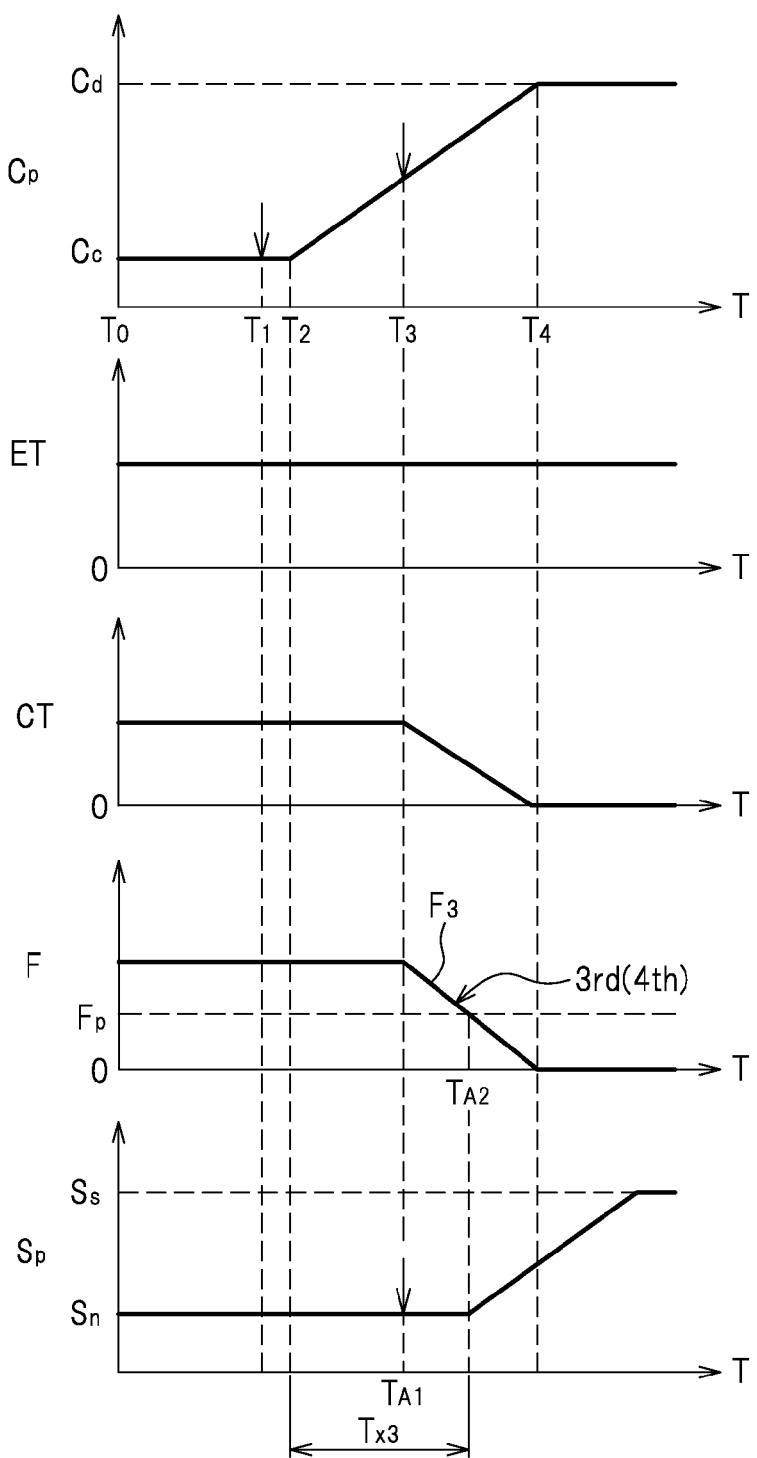
FIG. 12 is a timing chart for transmission control according to the second preferred embodiment of the present invention.

FIG. 12 is a timing chart for transmission control according to the present preferred embodiment. In FIG. 12, solid lines represent a shift-up operation to change the speed from the third speed to the fourth speed, and a shift-up operation to change the speed from the fourth speed to the fifth speed. The shift-up operation to change the speed from the third speed to the fourth speed, and the shift-up operation to change the speed from the fourth speed to the fifth speed are similar to each other. Hence, the solid line representing the shift-up operation to change the speed from the third speed to the fourth speed, and the solid line representing the shift-up operation to change the speed from the fourth speed to the fifth speed are overlapped with each other. The shift-up operation to change the speed from the third speed to the fourth speed is similar to that described in the first preferred embodiment, and therefore, description thereof will be omitted.

As described above, according to the present preferred embodiment, the delay time is appropriately set in accordance with the engagement force F between the dog portions 61 of the movable gear 60 and the dog portions 58 of the drive shaft gear 57, and the engagement force F between the dog portions 61 of the movable gear 60 and the dog portions 58 of the main shaft gear 53. As a result, similarly to the first preferred embodiment, the speed change time perceived by the driver is reduced.

Third Preferred Embodiment

Figure 13:
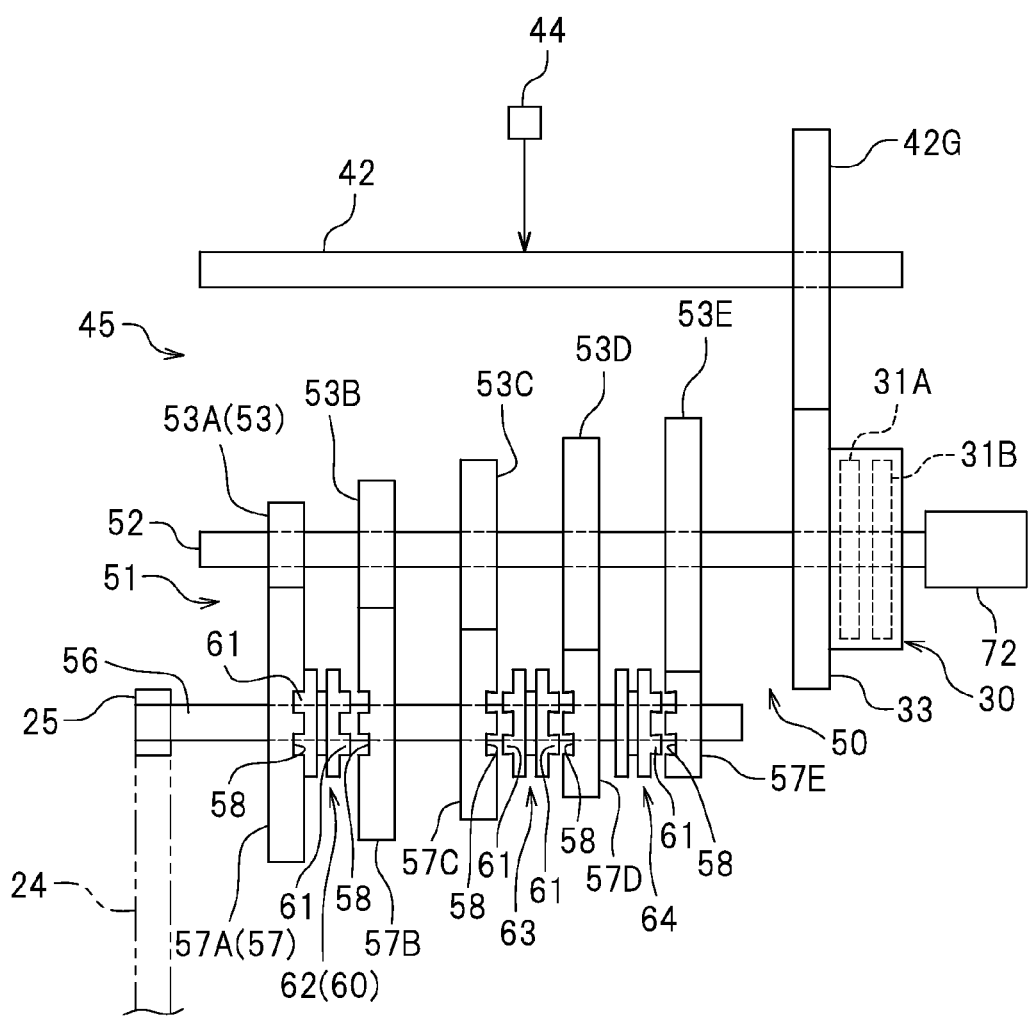
FIG. 13 is a schematic diagram illustrating a structure of a transmission according to a third preferred embodiment of the present invention.

In the first preferred embodiment, the dog portions 61 of the movable gears 60 are provided in accordance with uniform specifications, and the dog portions 58 of the drive shaft gears 57 are provided in accordance with uniform specifications. As illustrated in FIG. 13, in the third preferred embodiment, specifications for the dog portions 61 vary from one movable gear 60 to another, and specifications for the dog portions 58 vary from one drive shaft gear 57 to another. In the following description, elements similar to those in the first preferred embodiment are identified by the same reference signs, and description thereof will be omitted.

Figure 14:
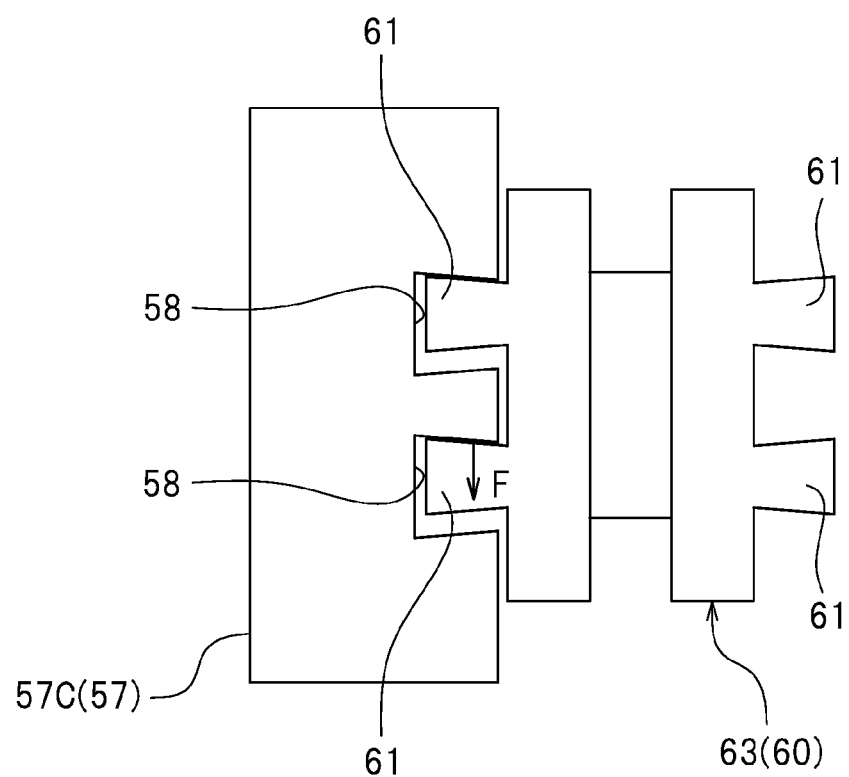
FIG. 14 is a partially enlarged view of FIG. 13.

As illustrated in FIG. 14, the dog portions 61 of the second movable gear 63 are each reversely tapered. Specifically, the dog portions 61 at the lateral surface of the second movable gear 63 facing the drive shaft gear 57C are provided so that widths of these dog portions 61 increase toward the drive shaft gear 57C. In other words, the dog portions 61 of the second movable gear 63 are provided so that the width of each dog portion 61 increases from its root toward its tip. The dog portions 58 of the drive shaft gear 57C are provided so that groove widths of the dog portions 58 decrease toward the second movable gear 63. In other words, the dog portions 58 of the drive shaft gear 57C are provided so that the groove width of each dog portion 58 increases toward its groove bottom. As illustrated in FIG. 13, the similar dog portions 61 are also provided on the lateral surface of the second movable gear 63 which faces the drive shaft gear 57D, and the similar dog portions 58 are also provided in the drive shaft gear 57D. The similar dog portions 61 are also provided on the third movable gear 64, and the similar dog portions 58 are also provided in the drive shaft gear 57E.

The dog portions 61 of the first movable gear 62 differ in shape from the dog portions 61 of the second movable gear 63. The dog portions 58 of the drive shaft gear 57A for the first speed and the drive shaft gear 57B for the second speed differ in shape from the dog portions 58 of the drive shaft gear 57C for the third speed and the drive shaft gear 57D for the fourth speed. The dog portions 61 of the second movable gear 63 are less disengageable than the dog portions 61 of the first movable gear 62.

Figure 15:
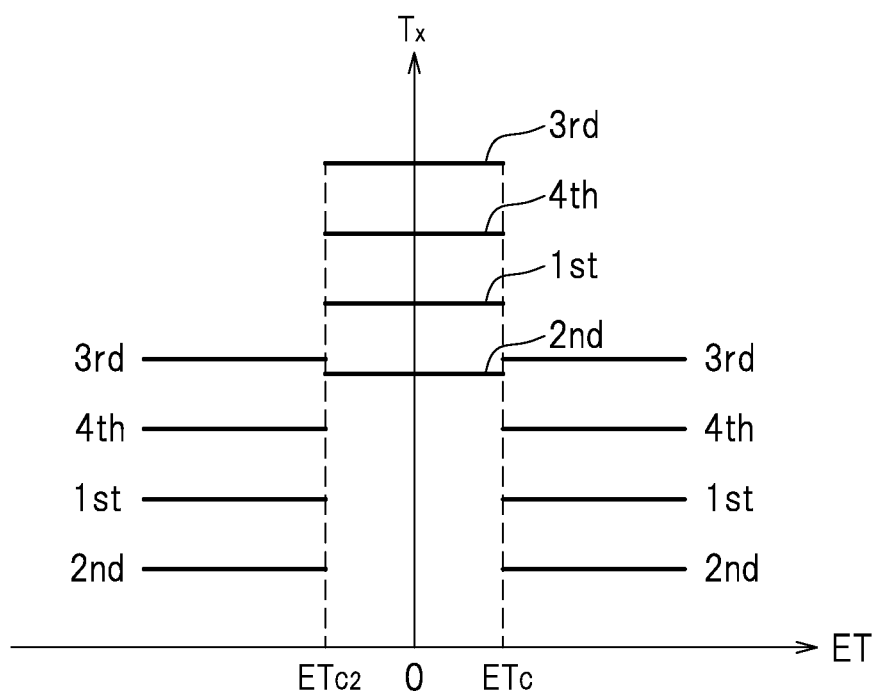
FIG. 15 is a map of delay times according to the third preferred embodiment of the present invention.

FIG. 15 is a diagram illustrating the delay time $T_x$ according to the present preferred embodiment. The dog portions 58 of the drive shaft gear 57C for the third speed and the dog portions 58 of the drive shaft gear 57D for the fourth speed are to be engaged with the dog portions 61 of the second movable gear 63. The dog portions 58 of the drive shaft gear 57A for the first speed and the dog portions 58 of the drive shaft gear 57B for the second speed are to be engaged with the dog portions 61 of the first movable gear 62. Therefore, the delay time $T_x$ when the speed is the third speed and the fourth speed is set to be longer than the delay time $T_x$ when the speed is the first speed and the second speed. The delay time $T_x$ is set on the basis of the specifications for the dog portions 61 of the movable gear 60. The specifications for the dog portions 61 include, for example, shapes and sizes of the dog portions 61, and distances of the dog portions 61 from the axial center of the movable gear 60. The specifications for the dog portions 61 can serve as an indicator of ease of disengagement of the dog portions 61. The delay time setting section 96 is programmed and configured to set the delay time $T_x$ so that the easier the disengagement of the dog portions 61, the shorter the delay time $T_x$. Similarly to the first preferred embodiment, assuming that the engine torque ET is positive, the delay time $T_x$ is set to be longer when the engine torque ET is smaller than the given value $ET_c$ than when the engine torque ET is equal to or greater than the given value $ET_c$. Assuming that the engine torque ET is negative, the delay time $T_x$ is set to be longer when the engine torque ET is greater than the given value $ET_{c2}$ than when the engine torque ET is equal to or smaller than the given value $ET_{c2}$.

As already mentioned above, the specifications for the dog portions 61 include distances of the dog portions 61 from the axial center of the movable gear 60. Assuming that the torque of the movable gear 60 remains the same, the engagement force of the dog portion 61 is inversely proportional to the distance between the axial center of the movable gear 60 and the dog portion 61 thereof. Therefore, the shorter the distance between the axial center and the dog portion 61, the greater the engagement force between the dog portions to be engaged with each other. When the distance between the dog portion 61 of the movable gear 60 and the axial center of the movable gear 60 varies, the engagement force between the dog portions to be engaged with each other varies. The delay time is appropriately set on the basis of the distances between the dog portions 61 of the movable gear 60 and the axial center of the movable gear 60, thus making it possible to reduce the speed change time perceived by the driver. For example, the delay time may be set to be longer when the distances between the dog portions 61 of the movable gear 60 and the axial center of the movable gear 60 are short than when the distances therebetween are long.

As described above, according to the present preferred embodiment, the delay time is appropriately set in accordance with the specifications for the dog portions 61 of the movable gear 60. Therefore, similarly to the first preferred embodiment, the speed change time perceived by the driver is reduced. Although the delay time is preferably set in accordance with the specifications for the dog portions 61 of the movable gear 60 in the present preferred embodiment, the delay time may be set in accordance with the specifications for the dog portions 58 of the drive shaft gear 57 or the dog portions 58 of the main shaft gear 53 (see FIG. 10). For example, the delay time may be set in accordance with the shapes of the dog portions 58 of the main shaft gears 53 or the dog portions 58 of the drive shaft gears 57. The delay time may be set in accordance with the distance between the dog portion 58 of the main shaft gears 53 and the axial center of the main shaft gears 53, or the distance between the dog portion 58 of the drive shaft gears 57 and the axial center of the drive shaft gears 57. Also in that case, effects similar to those described above are obtained.

Although several preferred embodiments of the present invention have been described thus far, the present invention is naturally not limited to each of the foregoing preferred embodiments. The present invention may be implemented in various other preferred embodiments. The foregoing preferred embodiments may be implemented in combination as appropriate. For example, various preferred embodiments of the present invention is also applicable to a dual clutch transmission.

The terms and expressions used herein are used for explanation purposes and should not be construed as being restrictive. It should be appreciated that the terms and expressions used herein do not eliminate any equivalents of features illustrated and mentioned herein, but allow various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transmission comprising:
a clutch configured to transmit or interrupt an engine torque;
a transmission mechanism including a main shaft connected to the clutch; main shaft gears corresponding to first to Nth speeds (where N is a natural number equal to or greater than 2) provided on the main shaft; drive shaft gears corresponding to the first to Nth speeds intermeshing with the main shaft gears for the first to Nth speeds, respectively; a drive shaft provided with the drive shaft gears; and a movable gear provided on the main shaft or the drive shaft so as to be movable in an axial direction of the main shaft or the drive shaft; and in which a dog portion is provided on a lateral surface of the movable gear and a dog portion, engageable with the dog portion of the movable gear, is provided on a lateral surface of at least one of the main shaft gears; and/or a dog portion is provided on the lateral surface of the movable gear and a dog portion, engageable with the dog portion of the movable gear, is provided on a lateral surface of at least one of the drive shaft gears;
a clutch actuator configured to cause the clutch to be disengaged and engaged;
a shift actuator configured to axially move the movable gear;
a delay time setting device programmed and configured to set a delay time which is a time period between a start of disengagement of the clutch and a start of movement of the movable gear; and
an actuator controller programmed and configured to control the clutch actuator and the shift actuator so that the movement of the movable gear is started after a lapse of the delay time, set by the delay time setting device, from the start of disengagement of the clutch; wherein
the delay time setting device is programmed and configured to set the delay time to a first delay time when an engagement force between dog portions which are to be disengaged from each other by the movement of the movable gear is a first engagement force, and to set the delay time to a second delay time shorter than the first delay time when the engagement force between the dog portions which are to be disengaged from each other by the movement of the movable gear is a second engagement force smaller than the first engagement force.

2. The transmission according to claim 1, wherein the delay time setting device is programmed and configured to set the delay time on a basis of a speed provided by the main shaft gear including the dog portion to be disengaged from the dog portion of the movable gear, or a speed provided by the drive shaft gear including the dog portion to be disengaged from the dog portion of the movable gear.

3. The transmission according to claim 2, wherein when the speeds provided by the main shaft gears, including the dog portions to be disengaged from the dog portions of the movable gear, or the speeds provided by the drive shaft gears, including the dog portions to be disengaged from the dog portions of the movable gear, are pth and qth speeds (where p is a natural number equal to or greater than 1 and equal to or smaller than N−1, and q is a natural number greater than p and equal to or smaller than N), the delay time setting device is programmed and configured to set the delay time for the pth speed and the delay time for the qth speed to the first delay time and the second delay time, respectively.

4. The transmission according to claim 1, wherein the delay time setting device is programmed and configured to set the delay time on a basis of the engine torque.

5. The transmission according to claim 4, wherein the clutch is a friction clutch, and the delay time setting device is programmed and configured to set the delay time to the first delay time when the engine torque is a first torque, and to set the delay time to the second delay time when the engine torque is a second torque greater than the first torque.

6. The transmission according to claim 1, wherein the delay time setting device is programmed and configured to set the delay time on a basis of whether a gear, including the dog portion to be disengaged from the dog portion of the movable gear, is the main shaft gear or the drive shaft gear.

7. The transmission according to claim 1, wherein when the speeds provided by the main shaft gears, including the dog portions to be disengaged from the dog portions of the movable gear, are pth and qth speeds (where p is a natural number equal to or greater than 1 and equal to or smaller than N−1, and q is a natural number greater than p and equal to or smaller than N) and that the delay time for the pth speed and the delay time for the qth speed are tp and tq, respectively, the delay times tp and tq are set so that tp=tq.

8. The transmission according to claim 1, wherein the delay time setting device is programmed and configured to set the delay time on a basis of specifications for the dog portion of the movable gear, the dog portion of the main shaft gears, or the dog portion of the drive shaft gears.

9. The transmission according to claim 8, wherein the delay time setting device is programmed and configured to set the delay time on a basis of a shape of the dog portion of the movable gear, the dog portion of the main shaft gears, or the dog portion of the drive shaft gears.

10. The transmission according to claim 8, wherein the delay time setting device is programmed and configured to set the delay time on a basis of a distance between the dog portion of the movable gear and an axial center of the movable gear, a distance between the dog portion of the main shaft gears and an axial center of the main shaft gears, or a distance between the dog portion of the drive shaft gears and an axial center of the drive shaft gears.

11. A straddle-type vehicle comprising the transmission according to claim 1.

* * * * *